US011109143B2

(12) United States Patent
Murata et al.

(10) Patent No.: US 11,109,143 B2
(45) Date of Patent: Aug. 31, 2021

(54) SIGNAL PROCESSING APPARATUS AND SIGNAL PROCESSING METHOD

(71) Applicant: SONY CORPORATION, Tokyo (JP)

(72) Inventors: Yasunobu Murata, Tokyo (JP); Kohei Asada, Kanagawa (JP); Yushi Yamabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 147 days.

(21) Appl. No.: 16/440,084

(22) Filed: Jun. 13, 2019

(65) Prior Publication Data

US 2019/0297411 A1 Sep. 26, 2019

Related U.S. Application Data

(63) Continuation of application No. 15/824,086, filed on Nov. 28, 2017, now Pat. No. 10,448,142, which is a
(Continued)

(30) Foreign Application Priority Data

Mar. 12, 2014 (JP) ................................ 2014-048426

(51) Int. Cl.
*G06F 17/00* (2019.01)
*H04R 1/10* (2006.01)
*G10K 11/178* (2006.01)

(52) U.S. Cl.
CPC ....... *H04R 1/1083* (2013.01); *G10K 11/1783* (2018.01); *G10K 11/17821* (2018.01);
(Continued)

(58) Field of Classification Search
CPC ................ H04R 1/1083; H04R 1/1041; H04R 2430/03; G10K 11/17823;
(Continued)

(56) References Cited

U.S. PATENT DOCUMENTS

2006/0153394 A1* 7/2006 Beasley ........... G10K 11/17823
381/57
2009/0082071 A1 3/2009 Hicks, III
(Continued)

FOREIGN PATENT DOCUMENTS

CN 101616351 A 12/2009
CN 101800920 A 8/2010
(Continued)

OTHER PUBLICATIONS

Notice of Allowance issued in U.S. Appl. No. 15/824,086 dated Jun. 14, 2019.

(Continued)

*Primary Examiner* — Joseph Saunders, Jr.
(74) *Attorney, Agent, or Firm* — Chip Law Group

(57) ABSTRACT

Disclosed is a signal processing apparatus including a surrounding sound signal acquisition unit, a NC (Noise Canceling) signal generation part, a cooped-up feeling elimination signal generation part, and an addition part. The surrounding sound signal acquisition unit is configured to collect a surrounding sound to generate a surrounding sound signal. The NC signal generation part is configured to generate a noise canceling signal from the surrounding sound signal. The cooped-up feeling elimination signal generation part is configured to generate a cooped-up feeling elimination signal from the surrounding sound signal. The addition part is configured to add together the generated noise canceling signal and the cooped-up feeling elimination signal at a prescribed ratio.

13 Claims, 20 Drawing Sheets

Related U.S. Application Data continuation of application No. 14/639,307, filed on Mar. 5, 2015, now Pat. No. 9,854,349.

(52) U.S. Cl.
CPC .................. *G10K 11/17823* (2018.01); *G10K 11/17827* (2018.01); *G10K 11/17854* (2018.01); *G10K 11/17857* (2018.01); *G10K 11/17873* (2018.01); *G10K 11/17875* (2018.01); *G10K 11/17885* (2018.01); *H04R 1/1041* (2013.01); *G10K 2210/1081* (2013.01); *G10K 2210/3014* (2013.01); *G10K 2210/3016* (2013.01); *H04R 2430/03* (2013.01)

(58) Field of Classification Search
CPC ....... G10K 11/17885; G10K 11/17827; G10K 11/178; G10K 2210/1081; G10K 2210/3014; G10K 2210/3016
See application file for complete search history.

(56) References Cited

U.S. PATENT DOCUMENTS

| | | | |
|---|---|---|---|
| 2012/0063611 | A1 | 3/2012 | Kimura |
| 2012/0281856 | A1 | 11/2012 | Georgiou et al. |
| 2015/0063601 | A1 | 3/2015 | Briggs et al. |

FOREIGN PATENT DOCUMENTS

| | | | |
|---|---|---|---|
| CN | 102404658 | A | 4/2012 |
| CN | 102754148 | A | 10/2012 |
| JP | 2005-295175 | A | 10/2005 |
| JP | 2009-529275 | A | 8/2009 |
| JP | 2011-254189 | A | 12/2011 |
| WO | 2008/015948 | A1 | 2/2008 |

OTHER PUBLICATIONS

Notice of Allowance for U.S. Appl. No. 14/639,307, dated Aug. 29, 2017, 07 pages.
Non-Final Office Action for U.S. Appl. No. 14/639,307, dated Feb. 27, 2017, 12 pages.
Non-Final Office Action for U.S. Appl. No. 14/639,307, dated Aug. 12, 2016, 18 pages.
Office Action for CN Patent Application No. 201510098047.0, dated Sep. 18, 2018, 09 pages of Office Action and 15 pages of English Translation.
Non-Final Office Action for U.S. Appl. No. 15/824,086, dated Apr. 5, 2019, 15 pages.
Notice of Allowance for U.S. Appl. No. 15/824,086, dated Jun. 14, 2019, 05 pages.

* cited by examiner

| Locations | Noises | User's operation states | Volume of music | Gain settings |
|---|---|---|---|---|
| Airplane | Stationary noises | Rest | Mute | Noise canceling 100% |
| Airplane | Non-stationary noises | Rest | Mute | Specific sound emphasis 50% + Noise canceling 50% |
| Office | Stationary noises | Rest | Mute | Noise canceling 100% |
| Office | Non-stationary noises | Rest | Mute | Specific sound emphasis 50% + Noise canceling 50% |
| Outdoor place (silent) | Stationary noises | Walking/ Running | Low | Cooped-up feeling elimination 100% |
| Outdoor place (silent) | Stationary noises | Walking/ Running | Middle | Cooped-up feeling elimination 50% + Specific sound emphasis 25% + Noise canceling 25% |
| Train | | | | |

FIG.19

SIGNAL PROCESSING APPARATUS AND SIGNAL PROCESSING METHOD

CROSS REFERENCE TO RELATED APPLICATIONS

The present application is a continuation application of U.S. patent application Ser. No. 15/824,086, filed Nov. 28, 2017 which is a continuation application of U.S. patent application Ser. No. 14/639,307, filed Mar. 5, 2015, now U.S. Pat. No. 9,854,349, which claims the benefit of priority from prior Japanese Patent Application JP 2014-048426, filed Mar. 12, 2014, the entire content of which is hereby incorporated by reference. Each of the above-referenced applications is hereby incorporated herein by reference in its entirety.

BACKGROUND

The present disclosure relates to signal processing apparatuses, signal processing method, and programs and, in particular, to a signal processing apparatus, a signal processing method, and a program allowing a user to simultaneously execute a plurality of audio signal processing functions.

Recently, some headphones have a prescribed audio signal processing function such as a noise canceling function that reduces surrounding noises (see, for example, Japanese Patent Application Laid-open Nos. 2011-254189, 2005-295175, and 2009-529275).

SUMMARY

A known headphone having a prescribed audio signal processing function allows a user to turn on/off a single function such as a noise canceling function and adjust the effecting degree of the function. In addition, the headphone having a plurality of audio signal processing functions allows the user to select and set one of the functions. However, the user is not allowed to control the plurality of audio signal processing functions in combination.

The present disclosure has been made in view of the above circumstances, and it is therefore desirable to allow a user to simultaneously execute a plurality of audio signal processing functions.

An embodiment of the present disclosure provides a signal processing apparatus including a surrounding sound signal acquisition unit, a NC (Noise Canceling) signal generation part, a cooped-up feeling elimination signal generation part, and an addition part. The surrounding sound signal acquisition unit is configured to collect a surrounding sound to generate a surrounding sound signal. The NC signal generation part is configured to generate a noise canceling signal from the surrounding sound signal. The cooped-up feeling elimination signal generation part is configured to generate a cooped-up feeling elimination signal from the surrounding sound signal. The addition part is configured to add together the generated noise canceling signal and the cooped-up feeling elimination signal at a prescribed ratio.

Another embodiment of the present disclosure provides a signal processing method including: collecting a surrounding sound to generate a surrounding sound signal; generating a noise canceling signal from the surrounding sound signal; generating a cooped-up feeling elimination signal from the surrounding sound signal; and adding together the generated noise canceling signal and the cooped-up feeling elimination signal at a prescribed ratio.

A still another embodiment of the present disclosure provides a program that causes a computer to function as: a surrounding sound signal acquisition unit configured to collect a surrounding sound to generate a surrounding sound signal; a NC (Noise Canceling) signal generation part configured to generate a noise canceling signal from the surrounding sound signal; a cooped-up feeling elimination signal generation part configured to generate a cooped-up feeling elimination signal from the surrounding sound signal; and an addition part configured to add together the generated noise canceling signal and the cooped-up feeling elimination signal at a prescribed ratio.

According to an embodiment of the present disclosure, a surrounding sound is collected to generate a surrounding sound signal, a noise canceling signal is generated from the surrounding sound signal, and a cooped-up feeling elimination signal is generated from the surrounding sound signal. Then, the generated noise canceling signal and the cooped-up feeling elimination signal are added together at a prescribed ratio, and a signal resulting from the addition is output.

Note that the program may be provided via a transmission medium or a recording medium.

The signal processing apparatus may be an independent apparatus or may be an internal block constituting one apparatus.

According to an embodiment of the present disclosure, it is possible for a user to simultaneously execute a plurality of audio signal processing functions.

Note that the effects described above are only for illustration and any effect described in the present disclosure may be produced.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 19 is a diagram describing an example of control based on an automatic control mode.

DETAILED DESCRIPTION OF EMBODIMENTS

Next, modes (hereinafter referred to as embodiments) for carrying out the present disclosure will be described. Note that the description will be given in the following order.

1. Appearance Example of Headphone
2. Functional Block Diagram of Headphone
3. First Embodiment of Signal Processing Unit
4. Second Embodiment of Signal Processing Unit
5. Example of Automatic Control Mode
6. Applied Example
7. Modified Example

1. Appearance Example of Headphone

Figure 1:
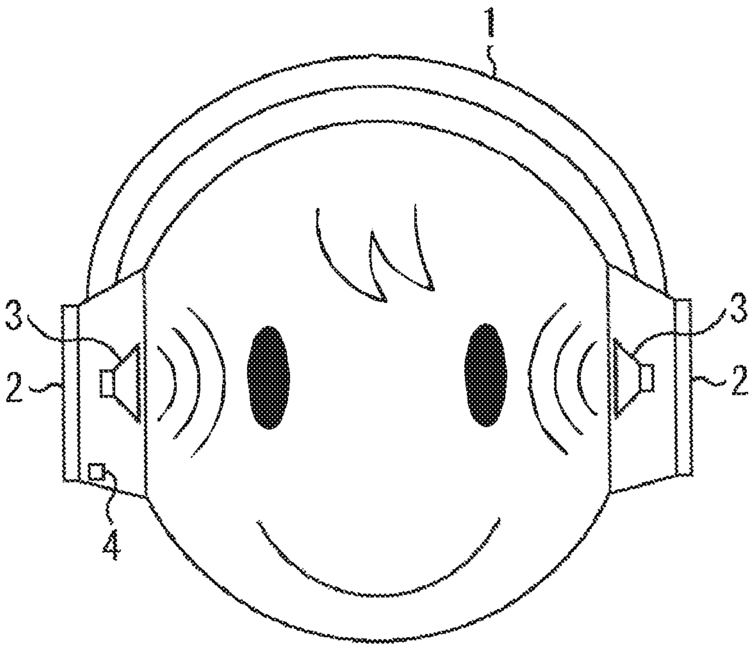
FIG. 1 is a diagram showing an appearance example of a headphone according to the present disclosure.

FIG. 1 is a diagram showing an appearance example of a headphone according to the present disclosure.

Like a typical headphone or the like, a headphone 1 shown in FIG. 1 acquires an audio signal from an outside music reproduction apparatus or the like and provides the audio signal from a speaker 3 inside a housing 2 to a user as an actual sound.

Note that examples of audio contents represented by an audio signal include various materials such as music (pieces), radio broadcasting, TV broadcasting, teaching materials for English conversation or the like, entertaining contents such as comic stories, video game sounds, motion picture sounds, and computer operating sounds, and thus are not particularly limited. In the specification, an audio signal (acoustic signal) is not limited to a sound signal generated from a person's sound.

The headphone 1 has a microphone 4, which collects a surrounding sound to output a surrounding sound signal, at a prescribed part of the housing 2.

The microphone 4 may be provided inside the housing 2 of the headphone 1 or may be provided outside the housing 2 thereof. If the microphone 4 is provided outside the housing 2, it may be directly provided outside the housing 2 or may be provided at other parts such as a band part that connects the right and left housings of the headphone 1 to each other or a control box that controls the volume or the like of the headphone 1. However, if a surrounding sound at a part close to an ear is collected, it is more desirable that the microphone 4 be provided at the part close to the ear. In addition, the microphone 4 that collects a surrounding sound may be provided one or two. However, when consideration is given to the position of the microphone 4 provided in the headphone 1 and the fact that most of typical surrounding sounds exist at low bands, the microphone 4 may be provided one only.

Further, the headphone 1 has the function (mode) of applying prescribed audio signal processing to a surrounding sound collected by the microphone 4. Specifically, the headphone 1 has at least four audio signal processing functions, i.e., a noise canceling function, a specific sound emphasizing function, a cooped-up feeding elimination function, and a surrounding sound boosting function.

The noise canceling function is a function in which a signal having a phase opposite to that of a surrounding sound is generated to cancel sound waves reaching the eardrum. When the noise canceling function is turned on, the user listens to a less surrounding sound.

The specific sound emphasizing function is a function in which a specific sound regarded as a noise (signal at a specific frequency band) is reduced, and is also called a noise reduction function. In the embodiment, the specific sound emphasizing function is incorporated as processing in which a sound (for example, an environmental sound) other than a sound generated by a surrounding person is regarded as a noise and reduced. Accordingly, when the specific sound emphasizing function is turned on, the user is allowed to satisfactorily listen to a sound generated by a surrounding person while listening to a less environmental sound.

The cooped-up feeling elimination function is a function in which a sound collected by the microphone 4 is output after being subjected to signal processing to allow the user to listen to a surrounding sound as if he/she were not wearing the headphone 1 at all or were wearing an open type headphone although actually wearing the headphone 1. When the cooped-up feeling elimination function is turned on, the user is allowed to listen to a surrounding environmental sound and a sound almost like a normal situation in which he/she does not wear the headphone 1.

Figure 2:
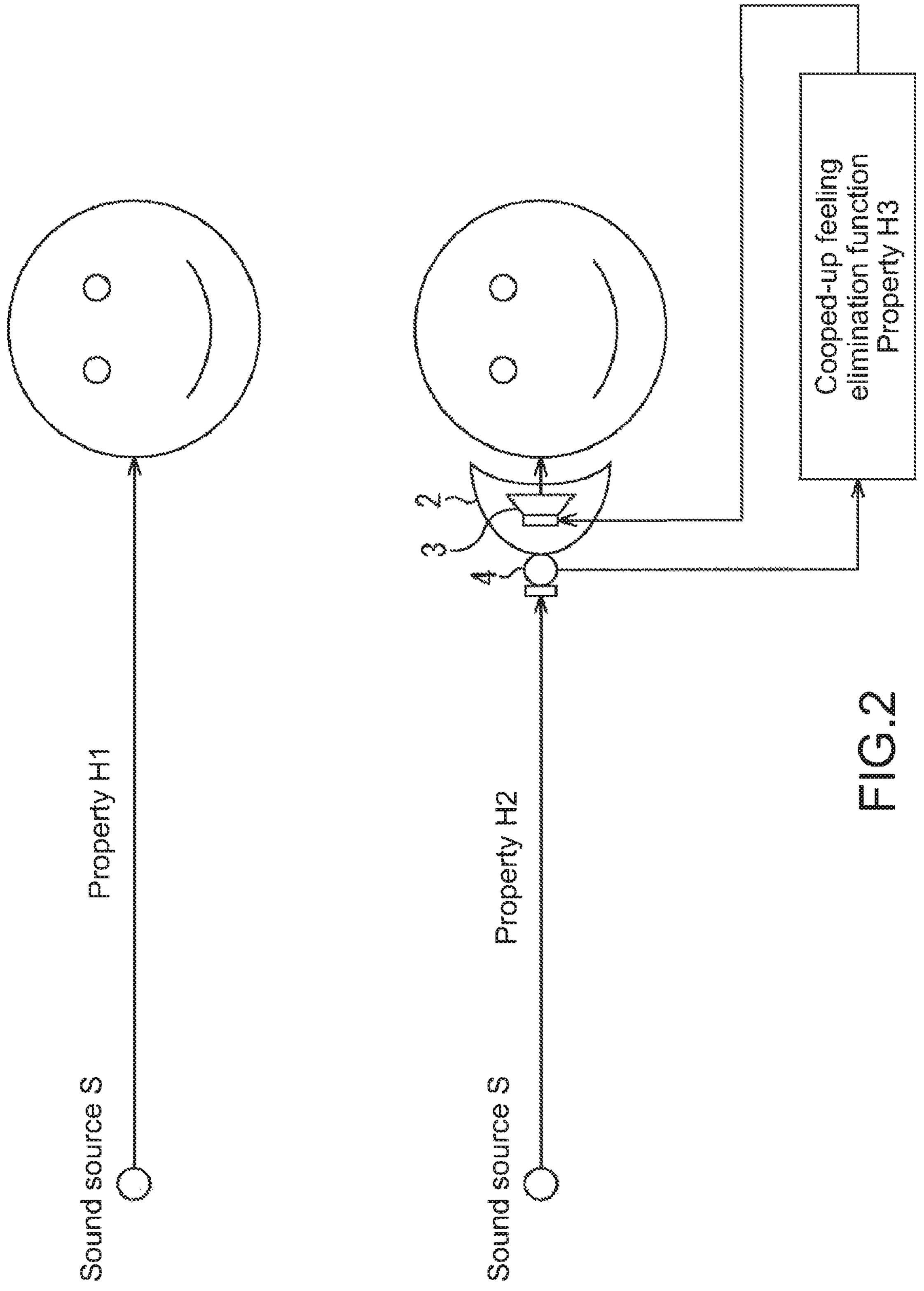
FIG. 2 is a diagram describing a cooped-up feeling elimination function.

FIG. 2 is a diagram describing the cooped-up feeling elimination function.

It is assumed that the property of a sound source S to which the user listens without the headphone 1 is H1. On the other hand, it is assumed that the property of the sound source S collected by the microphone 4 of the headphone 1 when the user listens to the sound source S with the headphone 1 is H2.

In this case, if the signal processing of a property H3 that establishes the relationship $H1=H2\times H3$ (expression 1) is applied as the cooped-up feeling elimination processing (function), it is possible to produce a state in which the user feels as if he/she were not wearing the headphone 1 at all although actually wearing the headphone 1.

In other words, the cooped-up feeling elimination function is the function in which the property H3 that establishes the relationship $H3=H1/H2$ is determined in advance according to measurement or the like and the signal processing of the above expression 1 is executed.

The surrounding sound boosting function is a function in which a surrounding sound signal is output with its level further boosted in the cooped-up feeling elimination function. When the surrounding sound boosting function is turned on, the user is allowed to listen to a surrounding environmental sound and a sound more loudly than a situation in which the user does not wear the headphone 1. The surrounding sound boosting function is similar to the function of a hearing aid.

2. Functional Block Diagram of Headphone

Figure 3:
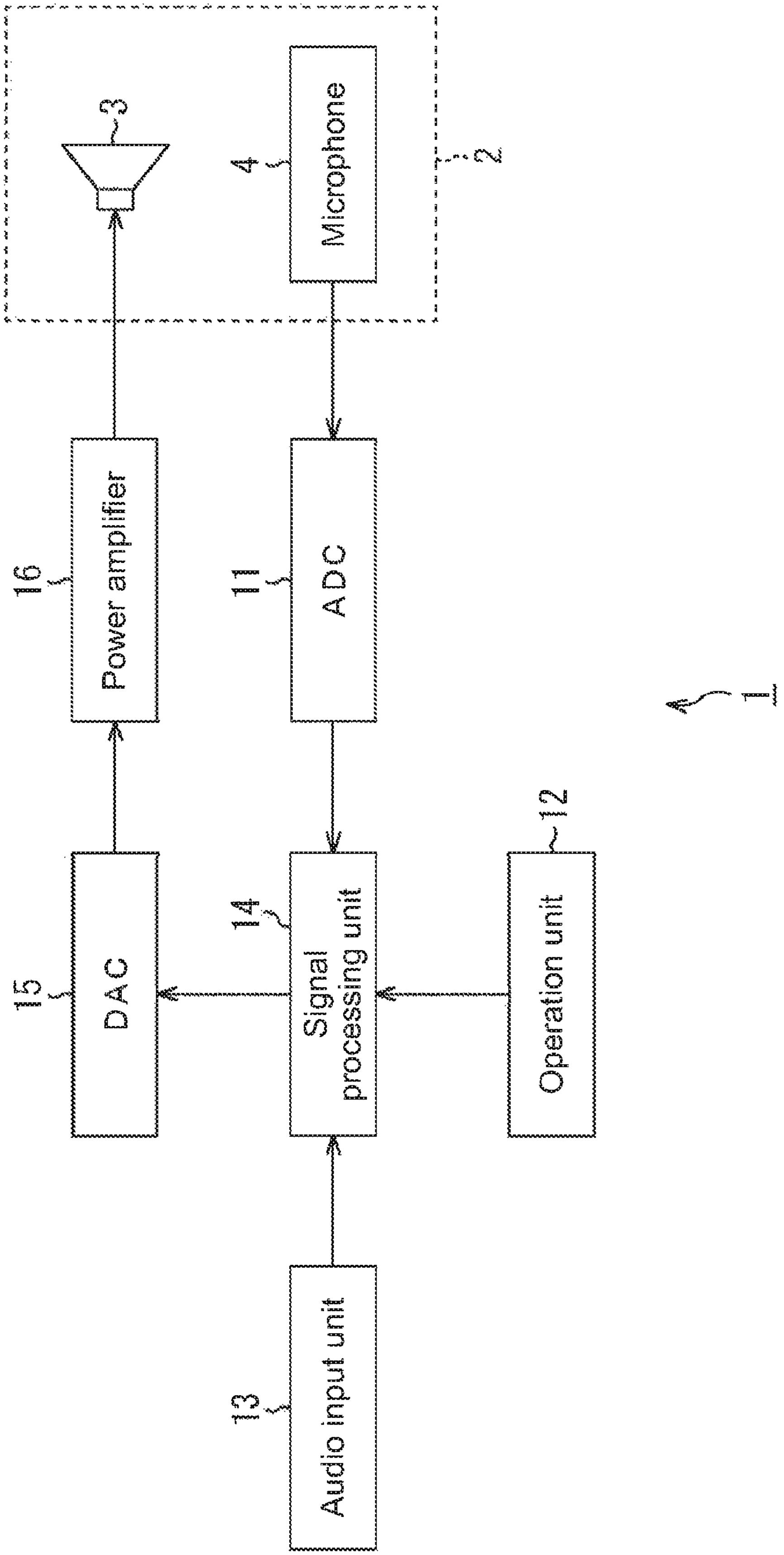
FIG. 3 is a block diagram showing the functional configuration of the headphone.

FIG. 3 is a block diagram showing the functional configuration of the headphone 1.

The headphone 1 has, besides the speaker 3 and the microphone 4 described above, an ADC (Analog Digital Converter) 11, an operation unit 12, an audio input unit 13, a signal processing unit 14, a DAC (Digital Analog Converter) 15, and a power amplifier 16.

The microphone 4 collects a surrounding sound to generate a surrounding sound signal and outputs the generated surrounding sound signal to the ADC 11. The microphone 4 functions as a surrounding sound signal acquisition unit.

The ADC 11 converts the analog surrounding sound signal input from the microphone 4 into a digital signal and outputs the converted digital signal to the signal processing unit 14. In the following description, the digital surrounding sound signal supplied to the signal processing unit 14 will be called a microphone signal.

The operation unit 12 accepts a user's operation on the headphone 1. For example, the operation unit 12 accepts a user's operation such as turning on/off the power supply of the headphone 1, controlling the volume of a sound output from the speaker 3, and turning on/off the plurality of audio signal processing functions and outputs an operation signal corresponding to the accepted operation to the signal processing unit 14.

The audio input unit 13 accepts the input of an audio signal (acoustic signal) output from an outside music reproduction apparatus or the like. In the embodiment, assuming that a prescribed music (piece) signal is input from the audio input unit 13, the audio signal input from the audio input unit 13 will be described as a music signal in the following description. However, as described above, the audio signal input from the audio input unit 13 is not limited to this.

In addition, it is assumed that a digital music signal is input to the audio input unit 13, but the audio input unit 13 may have an AD conversion function. That is, the audio input unit 13 may convert an input analog music signal into a digital signal and output the converted digital signal to the signal processing unit 14.

The signal processing unit 14 applies prescribed audio signal processing to the microphone signal supplied from ADC 11 and outputs the processed microphone signal to the DAC 15. In addition, the signal processing unit 14 applies prescribed audio signal processing to the music signal supplied from the audio input unit 13 and outputs the processed music signal to the DAC 15.

Alternatively, the signal processing unit 14 applies the prescribed audio signal processing to both the microphone signal and the music signal and outputs the processed microphone signal and the music signal to the DAC 15. The signal processing unit 14 may be constituted of a plurality of DSPs (Digital Signal Processors). The details of the signal processing unit 14 will be described later with reference to figures subsequent to FIG. 3.

The DAC 15 converts the digital audio signal output from the signal processing unit 14 into an analog signal and outputs the converted analog signal to the power amplifier 16.

The power amplifier 16 amplifies the analog audio signal output from the DAC 15 and outputs the amplified analog signal to the speaker 3. The speaker 3 outputs the analog audio signal supplied from the power amplifier 16 as a sound.

3. First Embodiment of Signal Processing Unit (Functional Block Diagram of Signal Processing Unit)

Figure 4:
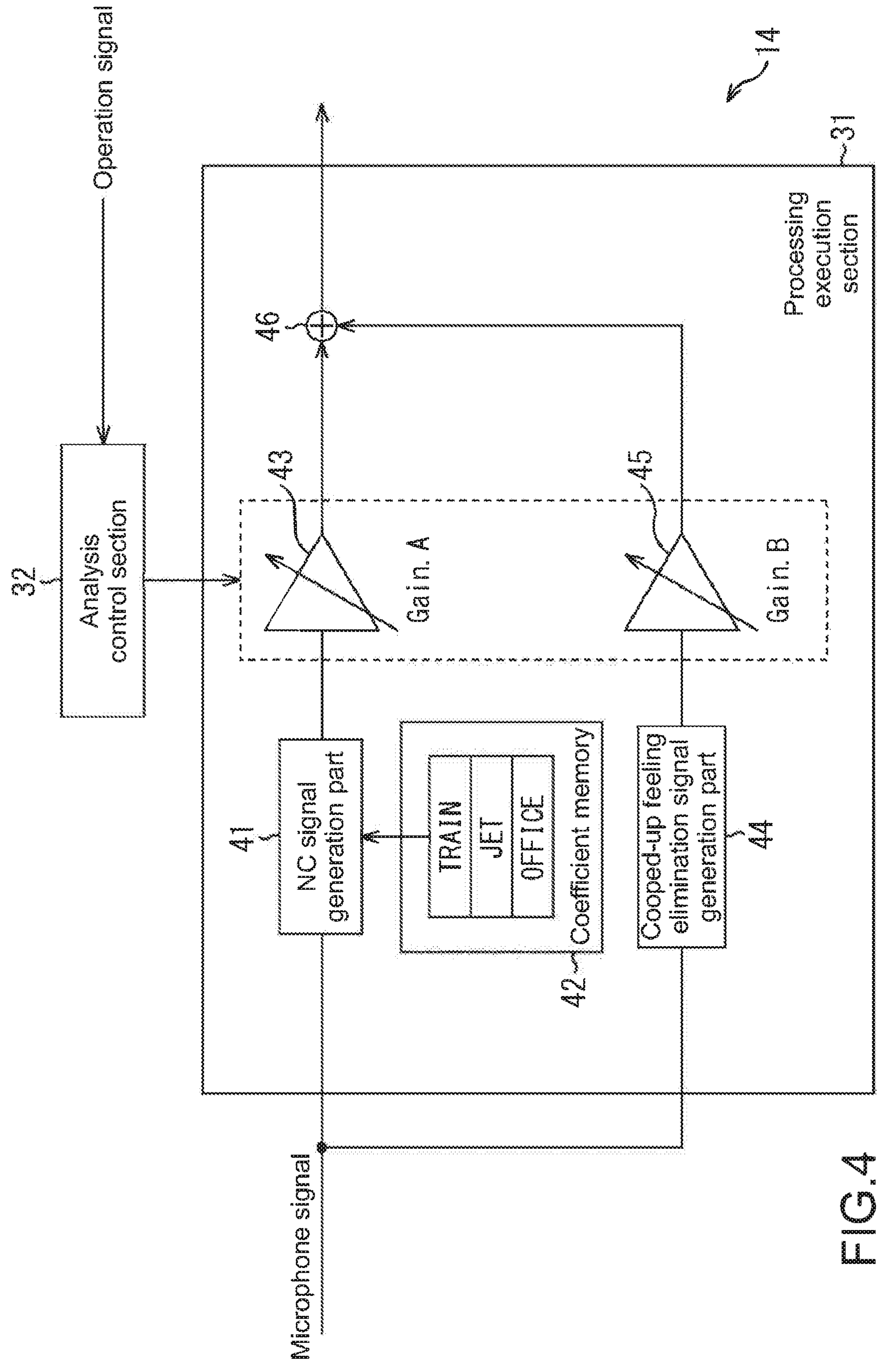
FIG. 4 is a block diagram showing a configuration example of a first embodiment of a signal processing unit.

FIG. 4 is a block diagram showing a configuration example of a first embodiment of the signal processing unit 14.

The signal processing unit 14 has a processing execution section 31 and an analysis control section 32. The processing execution section 31 has a NC (Noise Canceling) signal generation part 41, a coefficient memory 42, a variable amplifier 43, a cooped-up feeling elimination signal generation part 44, a variable amplifier 45, and an adder 46.

A microphone signal collected and generated by the microphone 4 is input to the NC signal generation part 41 and the cooped-up feeling elimination signal generation part 44 of the processing execution section 31.

The NC signal generation part 41 executes the noise canceling processing (function) with respect to the input microphone signal using a filter coefficient stored in the coefficient memory 42. That is, the NC signal generation part 41 generates a signal having a phase opposite to that of the microphone signal as a noise canceling signal and outputs the generated noise canceling signal to the variable amplifier 43. The NC signal generation part 41 may be constituted of, for example, a FIR (Finite Impulse Response) filter or an IIR (Infinite Impulse Response) filter.

The coefficient memory 42 stores a plurality of types of filter coefficients corresponding to surrounding environments and supplies a prescribed filter coefficient to the NC signal generation part 41 as occasion demands. For example, the coefficient memory 42 has a filter coefficient (TRAIN) most suitable for a case in which the user rides on a train, a filter coefficient (JET) most suitable for a case in which the user gets on an airplane, and a filter coefficient (OFFICE) most suitable for a case in which the user is in an office, or the like.

The variable amplifier 43 amplifies the noise canceling signal by multiplying the noise canceling signal as an output of the NC signal generation part 41 by a prescribed gain and outputs the amplified noise canceling signal to the adder 46. The gain of the variable amplifier 43 is set under the control of the analysis control section 32 and variable within a prescribed range. The gain setting value of the variable amplifier 43 supplied from the analysis control section 32 is called a gain A (Gain.A).

The cooped-up feeling elimination signal generation part 44 executes the cooped-up feeling elimination processing (function) based on the input microphone signal. That is, the cooped-up feeling elimination signal generation part 44 executes the signal processing of the above expression 1 using the microphone signal and outputs the processed cooped-up feeling elimination signal to the variable amplifier 45.

The variable amplifier 45 amplifies the cooped-up feeling elimination signal by multiplying the cooped-up feeling elimination signal as an output of the cooped-up feeling elimination signal generation part 44 by a prescribed gain and outputs the amplified cooped-up feeling elimination signal to the adder 46. The gain of the variable amplifier 45 is set under the control of the analysis control section 32 and variable like the gain of the variable amplifier 43. The gain setting value of the variable amplifier 45 supplied from the analysis control section 32 is called a gain B (Gain.B).

The adder 46 adds (combines) together the noise canceling signal supplied from the variable amplifier 43 and the cooped-up feeling elimination signal supplied from the variable amplifier 45 and outputs a signal resulting from the addition to the DAC 15 (FIG. 3). The combining ratio between the noise canceling signal and the cooped-up feeling elimination signal equals the gain ratio between the gain A of the variable amplifier 43 and the gain B of the variable amplifier 45.

The analysis control section 32 determines the gain A of the variable amplifier 43 and the gain B of the variable amplifier 45 based on an operation signal showing the effecting degrees of the noise canceling function and the cooped-up feeling elimination function supplied from the operation unit 12 and supplies the determined gains A and B to the variable amplifiers 43 and 45, respectively. In the embodiment, the gain setting values are set in the range of 0 to 1.

(Example of First User Interface)

The operation unit 12 of the headphone 1 has a user interface that allows the user to set the effecting degrees of the noise canceling function and the cooped-up feeling elimination function. The ratio between the noise canceling function and the cooped-up feeling elimination function set by the user via the interface is supplied from the operation unit 12 to the analysis control section 32.

Figure 5:
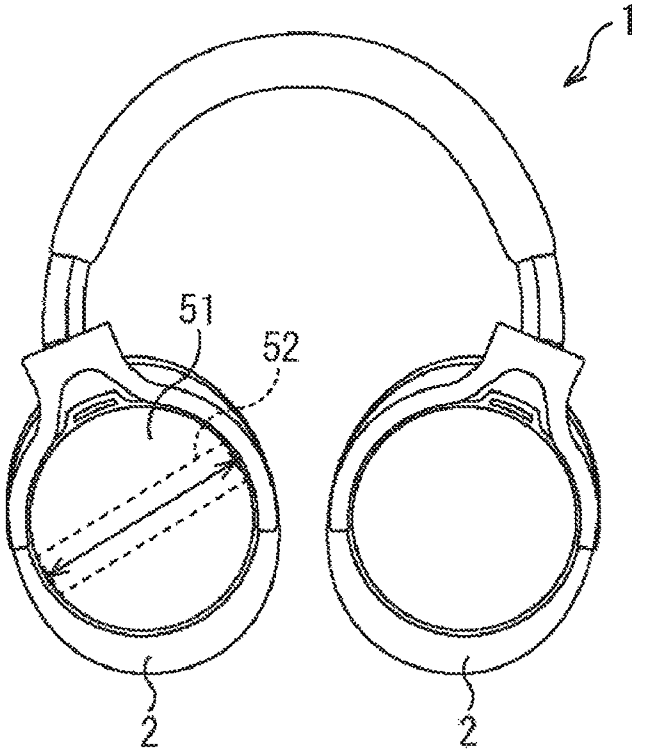
FIG. 5 is a diagram describing an example of a first user interface.

FIG. 5 is a diagram describing an example of a user interface that allows the user to set the effecting degrees of the noise canceling function and the cooped-up feeling elimination function.

For example, as a part of the operation unit 12, the headphone 1 has a detection area 51, in which a touch (contact) by the user is detected, at one of the right and left housings 2. The detection area 51 includes a single-axis operation area 52 having the noise canceling function and the cooped-up feeling elimination function as the end points thereof.

The user is allowed to operate the effecting degrees of the noise canceling function and the cooped-up feeling elimination function by touching a prescribed position at the single-axis operation area 52.

Figure 6:
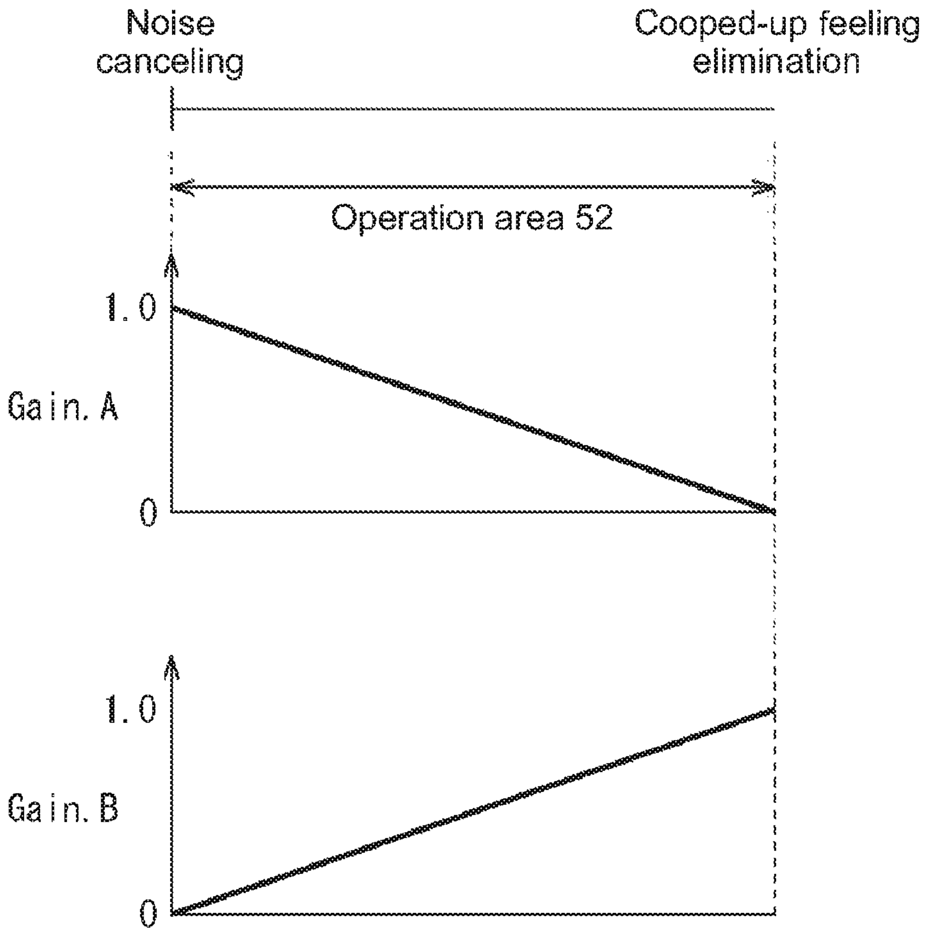
FIG. 6 is a diagram describing the example of the first user interface.

FIG. 6 is a diagram describing a user's operation with respect to the operation area 52 and the effecting degrees of the noise canceling function and the cooped-up feeling elimination function.

As shown in FIG. 6, the left end of the operation area 52 represents a case in which only the noise canceling function becomes effective and the right end thereof represents a case in which only the cooped-up feeling elimination function becomes effective.

For example, when the user touches the left end of the operation area 52, the analysis control section 32 sets the gain A of the noise canceling function at 1.0 and the gain B of the cooped-up feeling elimination function at 0.0.

On the other hand, when the user touches the right end of the operation area 52, the analysis control section 32 sets the gain A of the noise canceling function at 0.0 and the gain B of the cooped-up feeling elimination function at 1.0.

In addition, for example, when the user touches the intermediate position of the operation area 52, the analysis control section 32 sets the gain A of the noise canceling function at 0.5 and the gain B of the cooped-up feeling elimination function at 0.5. That is, the noise canceling function and the cooped-up feeling elimination function are equally applied (the effecting degrees of the noise canceling function and the cooped-up feeling elimination function are each reduced in half).

As described above, with the single-axis operation area 52 having the noise canceling function and the cooped-up feeling elimination function as the end points thereof, the operation unit 12 scalably accepts the ratio between the noise canceling function and the cooped-up feeling elimination function (the effecting degrees of the noise canceling function and the cooped-up feeling elimination function) and outputs the accepted ratio (the effecting degrees) to the analysis control section 32.

(Processing Flow of First Audio Signal Processing)

Next, a description will be given of audio signal processing (first audio signal processing) according to the first embodiment with reference to the flowchart of FIG. 7.

First, in step S1, the analysis control section 32 sets the default values of respective gains. Specifically, the analysis control section 32 supplies the default value of the gain A of the variable amplifier 43 and the default value of the gain B of the variable amplifier 45 set in advance as default values to the variable amplifier 43 and the variable amplifier 45, respectively.

In step S2, the microphone 4 collects a surrounding sound to generate a surrounding sound signal and outputs the generated surrounding sound signal to the ADC 11. The ADC 11 converts the analog surrounding sound signal input from the microphone 4 into a digital signal and outputs the converted digital signal to the signal processing unit 14 as a microphone signal.

In step S3, the NC signal generation part 41 generates a noise canceling signal having a phase opposite to that of the input microphone signal and outputs the generated noise canceling signal to the variable amplifier 43.

In step S4, the variable amplifier 43 amplifies the noise canceling signal by multiplying the noise canceling signal as an output of the NC signal generation part 41 by the gain A and outputs the amplified noise canceling signal to the adder 46.

In step S5, the cooped-up feeling elimination signal generation part 44 generates a cooped-up feeling elimination signal based on the input microphone signal and outputs the generated cooped-up feeling elimination signal to the variable amplifier 45.

In step S6, the variable amplifier 45 amplifies the cooped-up feeling elimination signal by multiplying the cooped-up feeling elimination signal as an output of the cooped-up feeling elimination signal generation part 44 by the gain B and outputs the amplified cooped-up feeling elimination signal to the adder 46.

Note that the processing of steps S3 and S4 and the processing of steps S5 and S6 may be simultaneously executed in parallel with each other.

In step S7, the adder 46 adds together the noise canceling signal supplied from the variable amplifier 43 and the cooped-up feeling elimination signal supplied from the variable amplifier 45 and outputs an audio signal resulting from the addition to the DAC 15.

In step S8, the speaker 3 outputs a sound corresponding to the added audio signal supplied from the signal processing unit 14 via the DAC 15 and the power amplifier 16. That is, the speaker 3 outputs the sound corresponding to the audio signal in which the noise canceling signal and the cooped-up feeling elimination signal are added together at a prescribed ratio (combining ratio).

In step S9, the analysis control section 32 determines whether the ratio between the noise canceling function and the cooped-up feeling elimination function has been changed. In other words, in step S9, determination is made as to whether the user has touched the operation area 52 and changed the ratio between the noise canceling function and the cooped-up feeling elimination function.

In step S9, if it is determined that an operation signal generated when the user touches the operation area 52 has not been supplied from the operation unit 12 to the analysis control section 32 and the ratio between the noise canceling function and the cooped-up feeling elimination function has not been changed, the processing returns to step S2 to repeatedly execute the processing of steps S2 to S9 described above.

On the other hand, if it is determined that the ratio between the noise canceling function and the cooped-up feeling elimination function has been changed, the processing proceeds to step S10 to cause the analysis control section 32 to set the gains of the noise canceling function and the cooped-up feeling elimination function. Specifically, the analysis control section 32 determines the gain A and the gain B at a ratio corresponding to the position at which the user has touched the operation area 52 and supplies the determined gain A and the gain B to the variable amplifier 43 and the variable amplifier 45, respectively.

After the processing of step S10, the processing returns to step S2 to repeatedly execute the processing of steps S2 to S9 described above.

Figure 7:
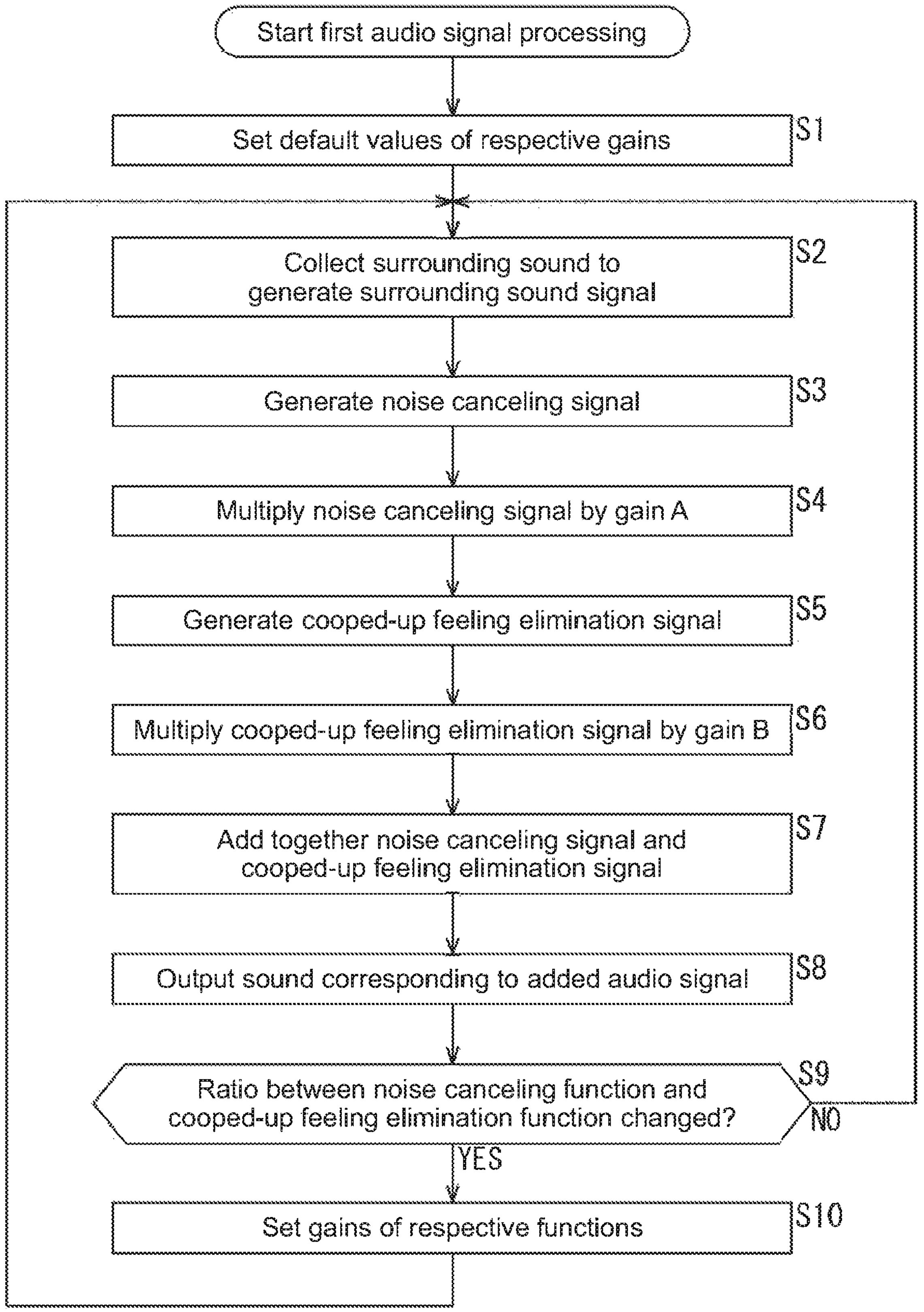
FIG. 7 is a flowchart describing first audio signal processing.

For example, the first audio signal processing of FIG. 7 starts when a first mode using the noise canceling function and the cooped-up feeling elimination function in combination is turned on and ends when the first mode is turned off.

According to the first audio signal processing described above, the user is allowed to simultaneously execute the two functions (audio signal processing functions), i.e., the noise canceling function and the cooped-up feeling elimination function with the headphone 1. In addition, at this time, the user is allowed to set the effecting degrees of the noise canceling function and the cooped-up feeling elimination function at desirable ratios.

4. Second Embodiment of Signal Processing Unit (Functional Block Diagram of Signal Processing Unit)

Figure 8:
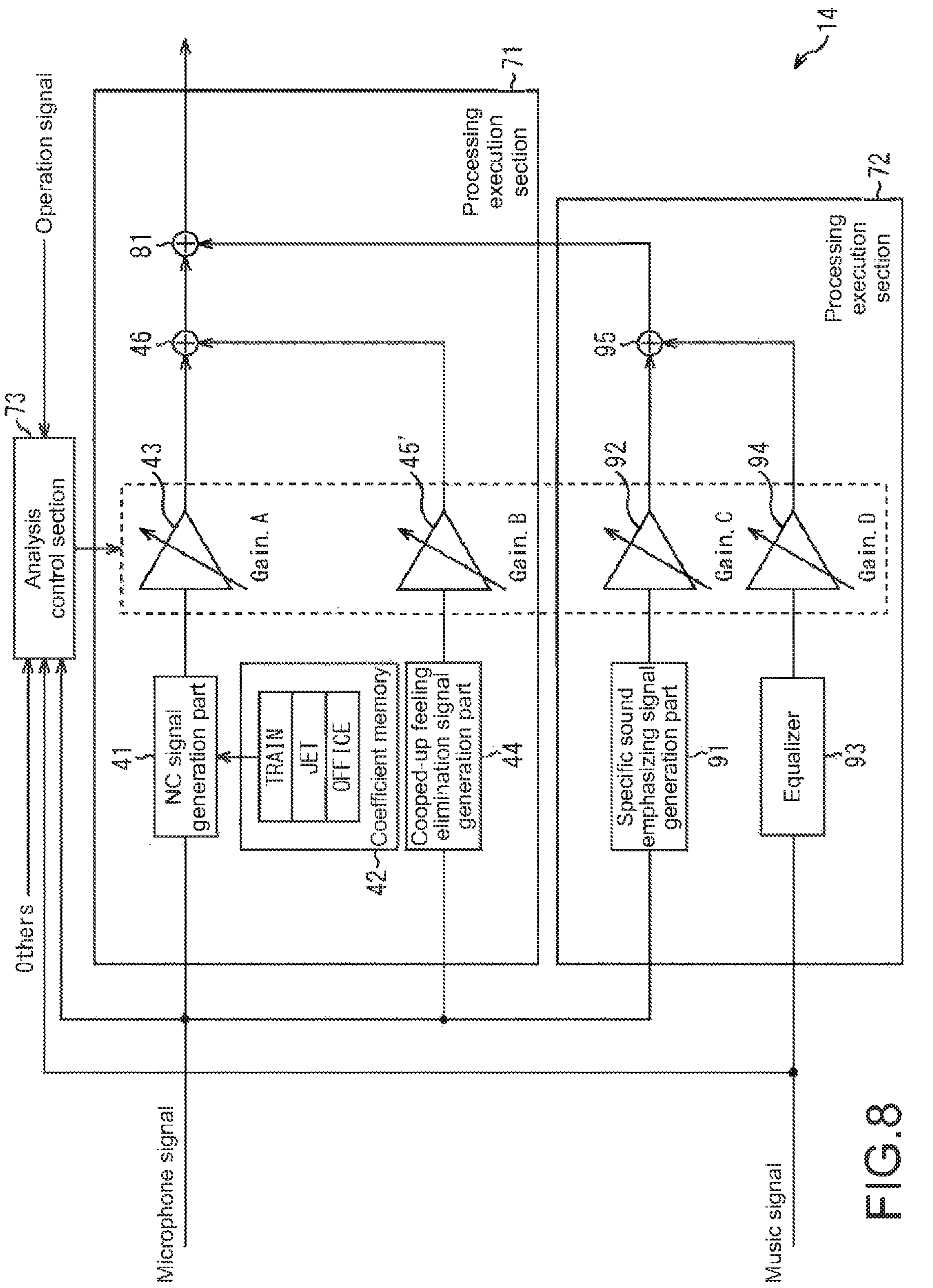
FIG. 8 is a block diagram showing a configuration example of a second embodiment of the signal processing unit.

FIG. 8 is a block diagram showing a configuration example of a second embodiment of the signal processing unit 14.

The signal processing unit 14 according to the second embodiment has processing execution sections 71 and 72 and an analysis control section 73.

The signal processing unit 14 according to the second embodiment receives a microphone signal collected and generated by the microphone 4 and a digital music signal input from the audio input unit 13.

Thus, the signal processing unit 14 according to the first embodiment described above applies the audio signal processing only to a surrounding sound collected by the microphone 4. However, the signal processing unit 14 according to the second embodiment applies prescribed signal processing also to a music signal output from an outside music reproduction apparatus or the like.

In addition, according to the first embodiment, the user is allowed to execute the two functions, i.e., the noise canceling function and the cooped-up feeling elimination function with the signal processing unit 14. However, according to the second embodiment, the user is allowed to execute the four functions, i.e., the noise canceling function, the cooped-up feeling elimination function, the specific sound emphasizing function, and the surrounding sound boosting function with the signal processing unit 14.

The processing execution section 71 has a NC signal generation part 41, a coefficient memory 42, a variable amplifier 43, a cooped-up feeling elimination signal generation part 44, a variable amplifier 45', an adder 46, and an adder 81. That is, the processing execution section 71 has a configuration in which the adder 81 is added to the configuration of the processing execution section 31 of the first embodiment.

The respective parts other than the adder 81 of the processing execution section 71 are the same as those of the first embodiment described above. However, the gain B of the variable amplifier 45' may be set in the range of, for example, 0 to 2, i.e., it may have a value of 1 or more. The processing execution section 71 operates as the cooped-up feeling elimination function when the gain B has a value of 0 to 1 and operates as the surrounding sound boosting function when it has a value of 1 to 2.

The adder 81 adds together a signal supplied from the adder 46 and a signal supplied from the processing execution section 72 and outputs a signal resulting from the addition to the DAC 15 (FIG. 3).

As will be described later, a signal in which a microphone signal after being subjected to the specific sound emphasizing processing and a music signal after being subjected to equalizing processing are added together is supplied from the processing execution section 72 to the adder 81. Accordingly, the adder 81 outputs a third combination signal to the DAC 15 as a result of adding together a first combination signal in which a noise canceling signal and a cooped-up feeling elimination signal or a surrounding sound boosting signal are combined together at a prescribed combining ratio and a second combination signal in which a specific sound emphasizing signal and a music signal are combined together at a prescribed combining ratio.

The processing execution section 72 has a specific sound emphasizing signal generation part 91, a variable amplifier 92, an equalizer 93, a variable amplifier 94, and an adder 95.

The specific sound emphasizing signal generation part 91 executes the specific sound emphasizing processing (function) that emphasizes the signal of a specific sound (at a specific frequency band) based on an input microphone signal. The specific sound emphasizing signal generation part 91 may be constituted of, for example, a BPF (Band Pass Filter), a HPF (High Pass Filter), or the like.

The variable amplifier 92 amplifies the specific sound emphasizing signal by multiplying the specific sound emphasizing signal as an output of the specific sound emphasizing signal generation part 91 by a prescribed gain and outputs the amplified specific sound emphasizing signal to the adder 95. The gain of the variable amplifier 92 is set under the control of the analysis control section 32 and variable within a prescribed range. The gain setting value of the variable amplifier 92 supplied from the analysis control section 32 is called a gain C (Gain.C).

The equalizer 93 applies the equalizing processing to an input music signal. The equalizing processing represents, for example, processing in which signal processing is executed at a prescribed frequency band to emphasize or reduce a signal in a specific range.

The variable amplifier 94 amplifies the music signal by multiplying the equalized music signal as an output of the equalizer 93 by a prescribed gain and outputs the amplified music signal to the adder 95.

The gain setting value of the variable amplifier 94 is controlled corresponding to the setting value of a volume operated at the operation unit 12. The gain of the variable amplifier 94 is set under the control of the analysis control section 32 and variable within a prescribed range. The gain setting value of the variable amplifier 94 supplied from the analysis control section 32 is called a gain D (Gain.D).

The adder 95 adds (combines) together the specific sound emphasizing signal supplied from the variable amplifier 92 and the music signal supplied from the variable amplifier 94 and outputs a signal resulting from the addition to the adder 81. The combining ratio between the specific sound emphasizing signal and the music signal equals the gain ratio between the gain C of the variable amplifier 92 and the gain D of the variable amplifier 94.

The adder 81 further adds (combines) together the first combination signal which is supplied from the adder 46 and in which the noise canceling signal and the cooped-up feeling elimination signal or the surrounding sound boosting signal are combined together at a prescribed combining ratio and the second combination signal which is supplied from the adder 95 and in which the specific sound emphasizing signal and the music signal are combined together at a prescribed combining ratio, and outputs a signal resulting from the addition to the DAC 15 (FIG. 3). The combining ratios between the noise canceling signal, the cooped-up feeling elimination signal (surrounding sound boosting signal), the specific sound emphasizing signal, and the music signal equal the gain ratios between the gains A to D.

The processing execution section 71 may be constituted of one DSP (Digital Signal Processor), and the processing execution section 72 may be constituted of another DSP.

As in the first embodiment, the analysis control section 73 controls the respective gains of the variable amplifier 43, the variable amplifier 45', the variable amplifier 92, and the variable amplifier 94 based on an operation signal showing the effecting degrees of the respective functions supplied from the operation unit 12.

In addition, the second embodiment has, besides manual settings by the user, an automatic control mode in which the optimum ratios between the respective functions are calculated based on surrounding situations, user's operation states, or the like and the respective gains are controlled based on the calculation results. When the automatic control mode is executed, a music signal, a microphone signal, and other sensor signals are supplied to the analysis control section 73 as occasion demands.

(Example of Second User Interface)

Figure 9:
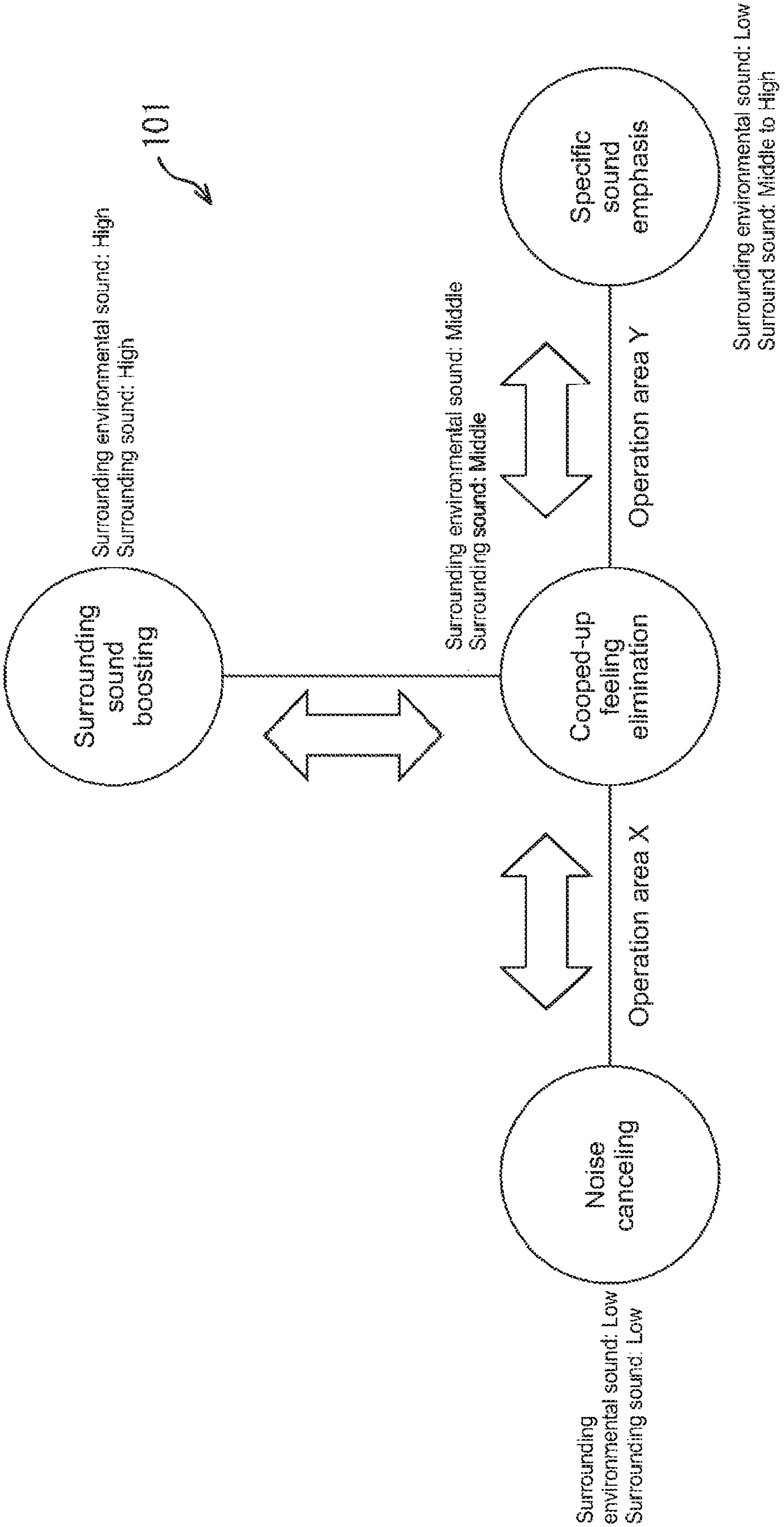
FIG. 9 is a diagram describing an example of a second user interface.

FIG. 9 is a diagram describing an example of a user interface that allows the user to set the effecting degrees of the respective functions according to the second embodiment.

According to the first embodiment, the two functions, i.e., the noise canceling function and the cooped-up feeling elimination function are combined together. Therefore, as shown in FIG. 5, the single-axis operation area 52 is provided in the detection area 51 to allow the user to set the ratio between the noise canceling function and the cooped-up feeling elimination function.

According to the second embodiment, as shown in, for example, FIG. 9, a reverse T-shaped operation area 101 is provided in the detection area 51.

The operation area 101 provides an interface in which the noise canceling function, the cooped-up feeling elimination function, and the specific sound emphasizing function are arranged in a line and a shift to the surrounding sound boosting function is allowed only from the cooped-up feeling elimination function arranged at the midpoint of the line. Note that an area on the line between the noise canceling function and the cooped-up feeling elimination function will be called an operation area X and an area on the line between the cooped-up feeling elimination function and the specific sound emphasizing function will be called an operation area Y.

The surrounding sound boosting function boosts a surrounding environmental sound and a sound at a greater level than the cooped-up feeling elimination function does. Therefore, even if the noise canceling function and the specific sound emphasizing function are executed, these functions are canceled by the surrounding sound boosting function. Thus, as shown in the operation area 101 of FIG. 9, the execution of the surrounding sound boosting function is allowed only when the cooped-up feeling elimination function is executed.

The operation unit 12 detects a position touched by the user in the operation area 101 provided in the detection area 51 and outputs a detection result to the analysis control section 73 as an operation signal.

The analysis control section 73 determines the ratios (combining ratios) between the respective functions based on a position touched by the user in the operation area 101 and controls the respective gains of the variable amplifier 43, the variable amplifier 45', the variable amplifier 92, and the variable amplifier 94.

When the user touches a prescribed position in the operation area X, the operation unit 12 outputs a signal in which the noise canceling signal and the cooped-up feeling elimination signal are combined together at a prescribed ratio. Further, when the user touches a prescribed position in the operation area Y, the operation unit 12 outputs a signal in which the cooped-up feeling elimination signal and the specific sound emphasizing signal are combined together at a specific ratio.

Figure 10:
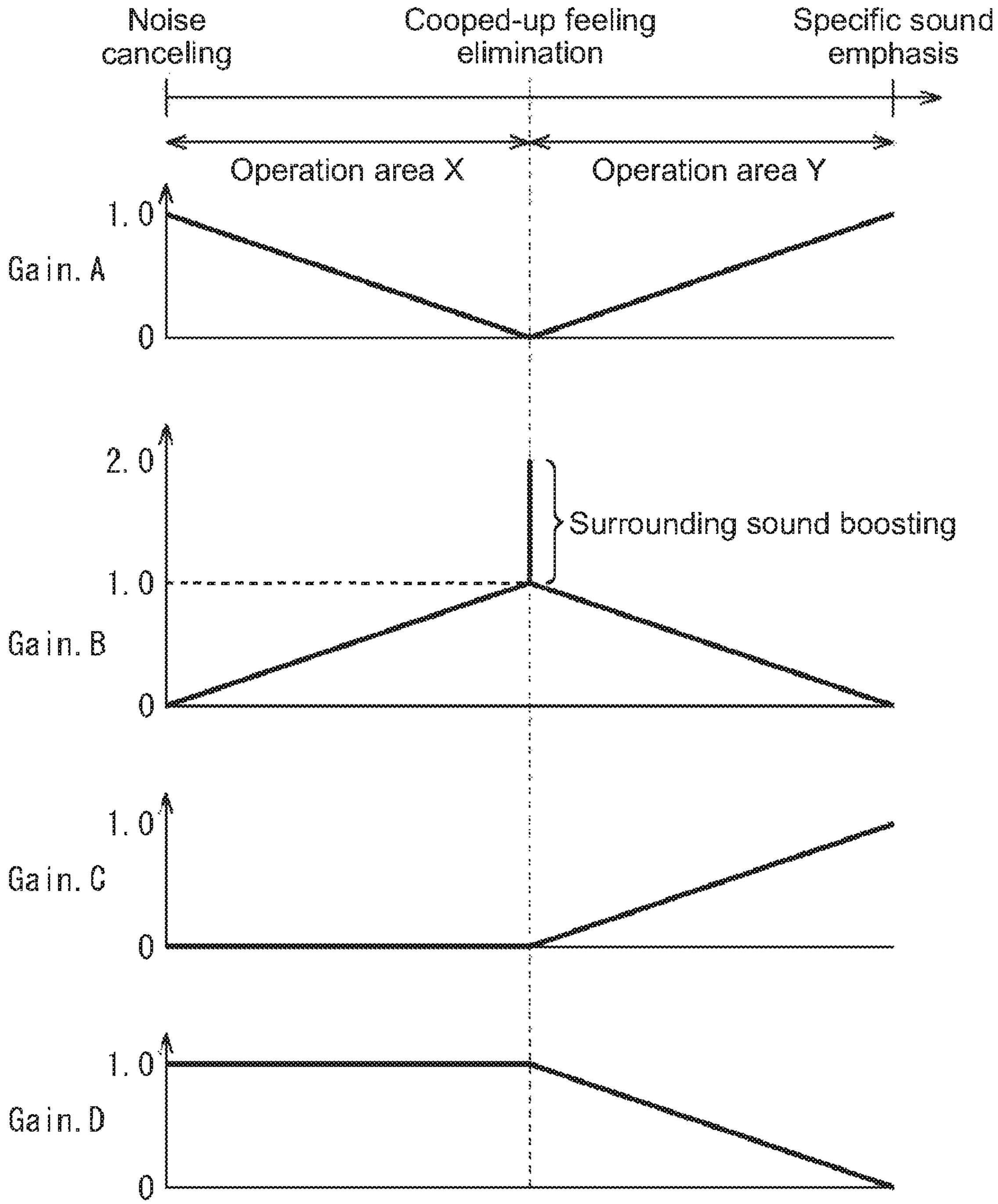
FIG. 10 is a diagram describing the example of the second user interface.

FIG. 10 is a diagram showing an example of the gains A to D determined corresponding to a position touched by the user in the operation area 101.

The analysis control section 73 provides the gains A to D as shown in FIG. 10 according to a position touched by the user in the operation area 101.

In the example of FIG. 10, when only the cooped-up feeling elimination function is executed, the gain B may be set at 1 or more. In a state in which the gain B is set at 1 or more, the surrounding sound boosting function is executed.

(Example of Third User Interface)

With the interface shown in FIG. 9, the headphone 1 is allowed to output the combination signal of the noise canceling signal and the cooped-up feeling elimination signal and the combination signal of the cooped-up feeling elimination signal and the specific sound emphasizing signal but is not allowed to output the combination signal of the noise canceling signal and the specific sound emphasizing signal.

Figure 11:
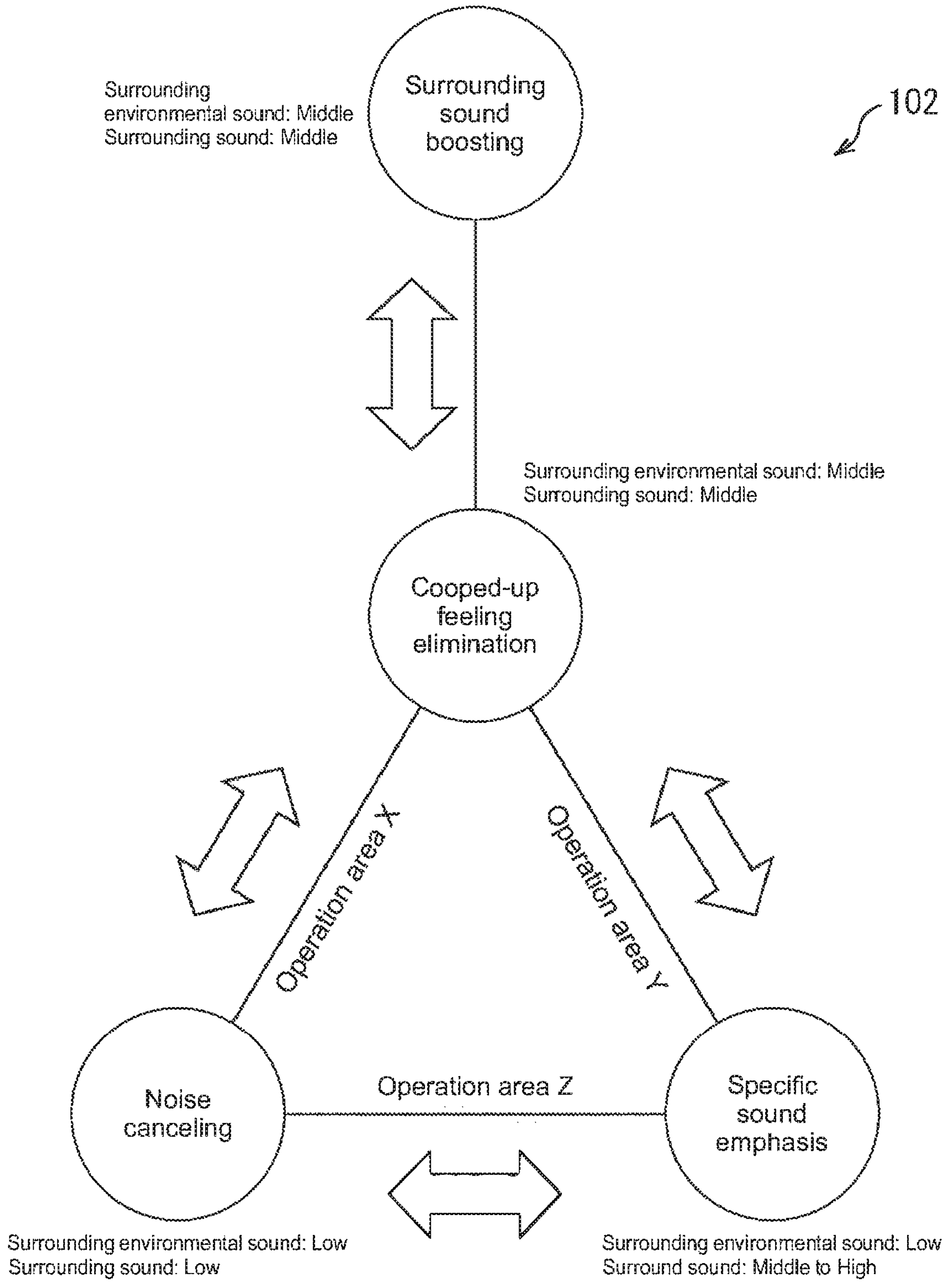
FIG. 11 is a diagram describing an example of a third user interface.

Therefore, an operation area 102 as shown in, for example, FIG. 11 may be provided in the detection area 51.

FIG. 11 shows an example of another user interface according to the second embodiment.

With the user interface, the headphone 1 is allowed to output a signal in which the noise canceling signal and the specific sound emphasizing signal are combined together at a prescribed ratio (combining ratio) when the user touches a prescribed position in an operation area Z on the line between the noise canceling function and the specific sound emphasizing function.

Figure 12:
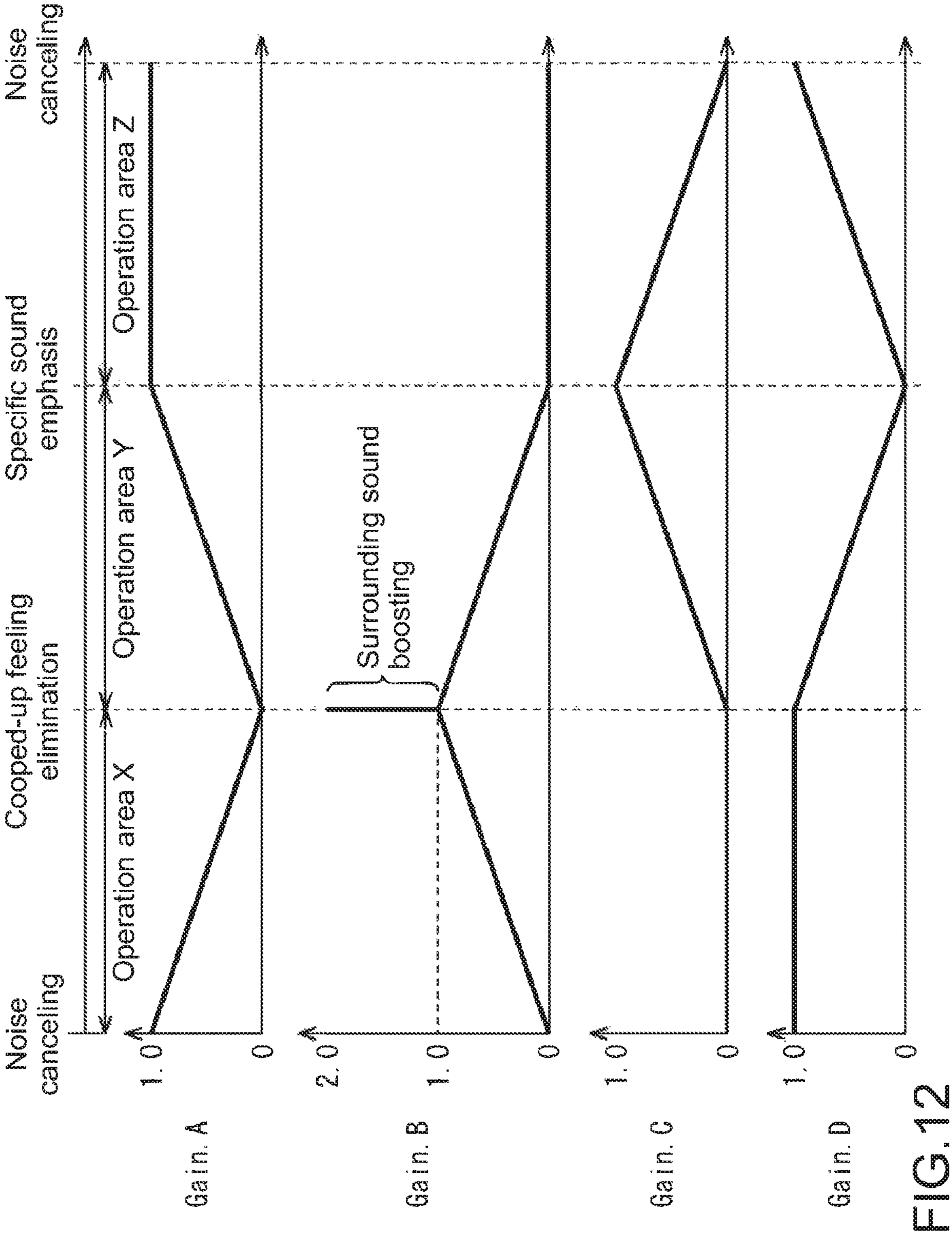
FIG. 12 is a diagram describing the example of the third user interface.

FIG. 12 is a diagram showing an example of the gains A to D determined corresponding to a position touched by the user in the operation area 102.

The analysis control section 73 provides the gains A to D as shown in FIG. 12 according to a position touched by the user in the operation area 102.

(Example of Fourth User Interface)

Figure 13:
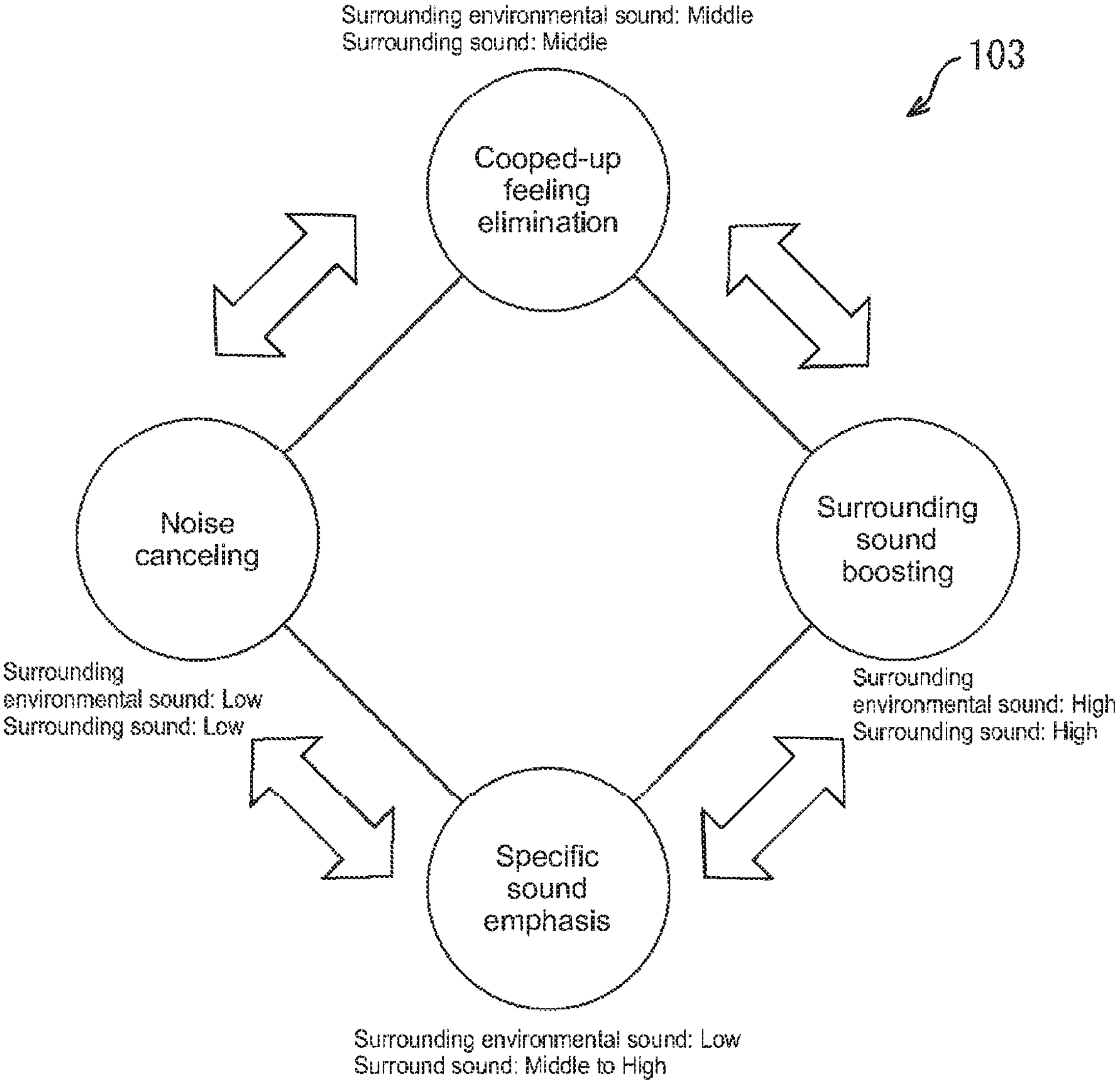
FIG. 13 is a diagram describing an example of a fourth user interface.

Further, as shown in FIG. 13, the four types of functions, i.e., the noise canceling function, the cooped-up feeling elimination function, the surrounding sound boosting function, and the specific sound emphasizing function may be simply allocated as those forming a square operation area 103 and provided in the detection area 51. In this case, the central area of the square is a blind area.

Figure 14:
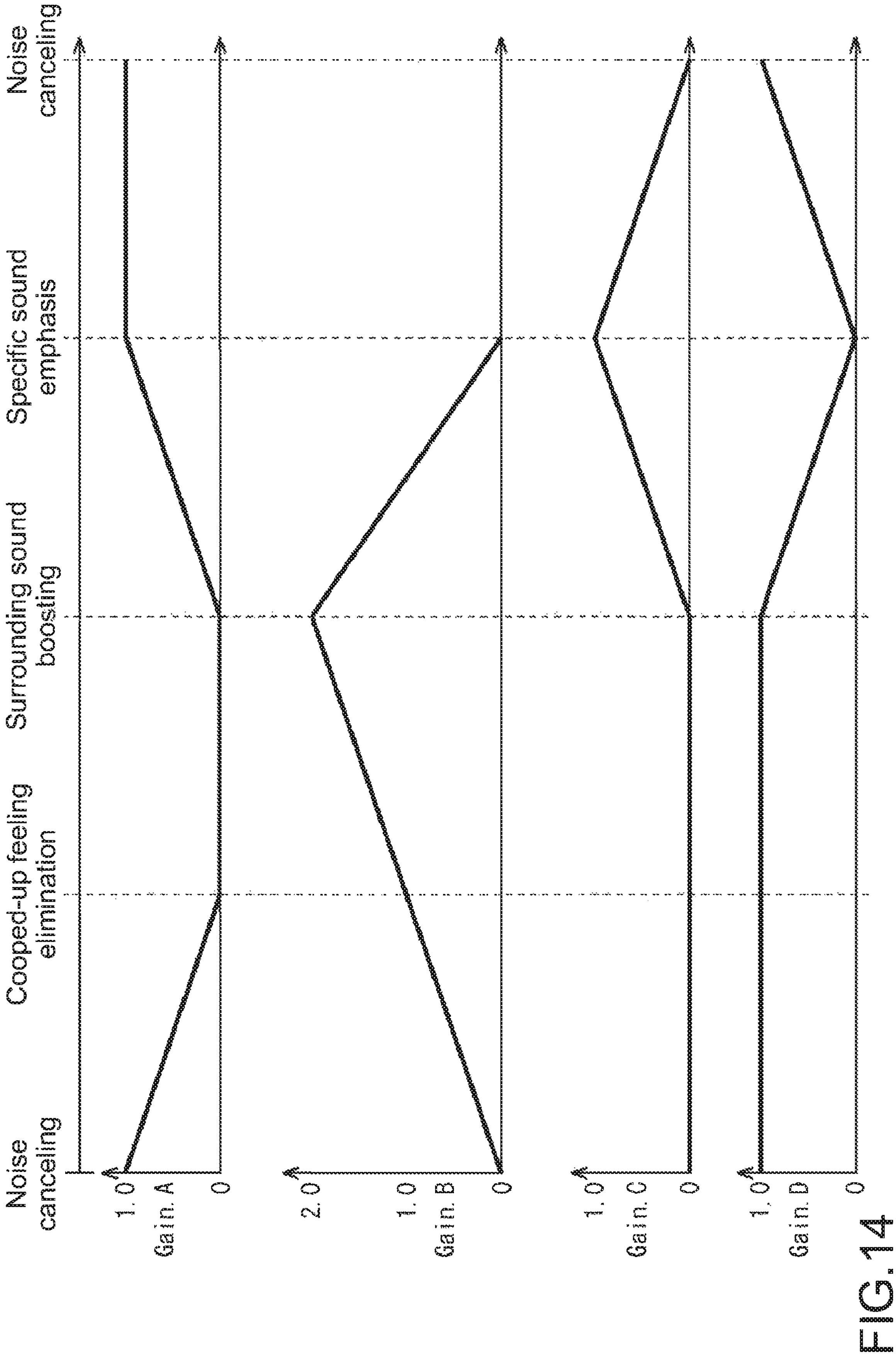
FIG. 14 is a diagram describing the example of the fourth user interface.

FIG. 14 is a diagram showing an example of the gains A to D determined corresponding to a position touched by the user in the operation area 103 shown in FIG. 13.

Note that the gain setting values shown in FIGS. 6, 10, 12, and 14 are only for illustration and other setting methods are of course available. In addition, the gain setting value for each of the functions is changed linearly but may be changed non-linearly.

Moreover, in the examples described above, the user touches a desired position on a line connecting the respective functions to each other to set the ratios between the respective functions. However, the user may set the desired ratios between the respective functions through a sliding operation.

For example, in a case in which the operation area 101 described above with reference to FIG. 9 is provided in the detection area 51, the user may employ an operation method in which a setting point is moved on the reverse T-shaped line according to a sliding direction and a sliding amount.

Note that when such a method with the sliding operation is employed, it is difficult for the user to appropriately move the setting point to a position at which only the cooped-up feeling elimination function is, for example, executed. In order to address this, a user interface may be employed in which the setting point is temporarily stopped (locked) at a position at which each of the functions is singly executed when the user performs the sliding operation and in which the user is allowed to perform the sliding operation in a desired direction if he/she wants to further move the setting point.

(Processing Flow of Second Audio Signal Processing)

Next, a description will be given of audio signal processing (second audio signal processing) according to the second embodiment with reference to the flowchart of FIG. 15.

First, in step S21, the analysis control section 73 sets the default values of respective gains. Specifically, the analysis control section 73 sets the default values of the gain A of the variable amplifier 43, the gain B of the variable amplifier 45', the gain C of the variable amplifier 92, and the gain D of the variable amplifier 94 set in advance as default values.

In step S22, the microphone 4 collects a surrounding sound to generate a surrounding sound signal and outputs the generated surrounding sound signal to the ADC 11. The ADC 11 converts the analog surrounding sound signal input from the microphone 4 into a digital signal and outputs the converted digital signal to the signal processing unit 14 as a microphone signal.

In step S23, the audio input unit 13 receives a music signal output from an outside music reproduction apparatus or the like and outputs the received music signal to the signal processing unit 14. The processing of step S22 and the processing of step S23 may be simultaneously executed in parallel with each other.

In step S24, the NC signal generation part 41 generates a noise canceling signal and outputs the generated noise canceling signal to the variable amplifier 43. In addition, the variable amplifier 43 amplifies the noise canceling signal by multiplying the noise canceling signal by the gain A and outputs the amplified noise canceling signal to the adder 46.

In step S25, the cooped-up feeling elimination signal generation part 44 generates a cooped-up feeling elimination signal based on the microphone signal and outputs the generated cooped-up feeling elimination signal to the variable amplifier 45'. In addition, the variable amplifier 45' amplifies the cooped-up feeling elimination signal by multiplying the cooped-up feeling elimination signal by the gain B and outputs the multiplied cooped-up feeling elimination signal to the adder 46.

Note that the processing of step S24 and the processing of step S25 may be simultaneously executed in parallel with each other.

In step S26, the adder 46 adds together the noise canceling signal supplied from the variable amplifier 43 and the cooped-up feeling elimination signal supplied from the variable amplifier 45' to generate a first combination signal in which the noise canceling signal and the cooped-up feeling elimination signal are combined together at a prescribed combining ratio. The adder 46 outputs the generated first combination signal to the adder 81.

In step S27, the specific sound emphasizing signal generation part 91 generates a specific sound emphasizing signal, in which the signal of a specific sound is emphasized, based on the microphone signal and outputs the generated specific sound emphasizing signal to the variable amplifier 92. In addition, the variable amplifier 92 amplifies the specific sound emphasizing signal by multiplying the specific sound emphasizing signal by the gain C and outputs the amplified specific sound emphasizing signal to the adder 95.

In step S28, the equalizer 93 applies equalizing processing to the music signal and outputs the processed music signal to the variable amplifier 94. In addition, the variable amplifier 94 amplifies the music signal by multiplying the processed music signal by the gain D and outputs the amplified music signal to the adder 95.

In step S29, the adder 95 adds together the specific sound emphasizing signal supplied from the variable amplifier 92 and the music signal supplied from the variable amplifier 94 to generate a second combination signal in which the specific sound emphasizing signal and the music signal are combined together at a prescribed combining ratio. The adder 95 outputs the generated second combination signal to the adder 81.

Note that the processing of step S27 and the processing of step S28 may be simultaneously executed in parallel with each other. In addition, the processing of steps S24 to S26 for generating the first combination signal and the processing of steps S27 to S29 for generating the second combination signal may be simultaneously executed in parallel with each other.

In step S30, the adder 81 adds together the first combination signal in which the noise canceling signal and the cooped-up feeling elimination signal are combined together at a prescribed combining ratio and the second combination signal in which the specific sound emphasizing signal and the music signal are combined together at a prescribed combining ratio and outputs a resulting third combination signal to the DAC 15.

In step S31, the speaker 3 outputs a sound corresponding to the third combination signal supplied from the signal processing unit 14 via the DAC 15 and the power amplifier 16.

In step S32, the analysis control section 73 determines whether the ratios between the respective functions have been changed.

In step S32, if it is determined that an operation signal generated when the user touches the operation area 101 of FIG. 9 has not been supplied from the operation unit 12 to the analysis control section 73 and the ratios between the respective functions have not been changed, the processing returns to step S22 to repeatedly execute the processing of steps S22 to S32 described above.

On the other hand, if it is determined that the operation area 101 has been touched by the user and the ratios between the respective functions have been changed, the processing proceeds to step S33 to cause the analysis control section 73 to set the gains of the respective functions. Specifically, the analysis control section 73 sets the respective gains (gains A, B, and C) of the variable amplifier 43, the variable amplifier 45', and the variable amplifier 92 at a ratio corresponding to a position touched by the user in the operation area 101.

After the processing of step S33, the processing returns to step S22 to repeatedly execute the processing of steps S22 to S32 described above.

Figure 15:
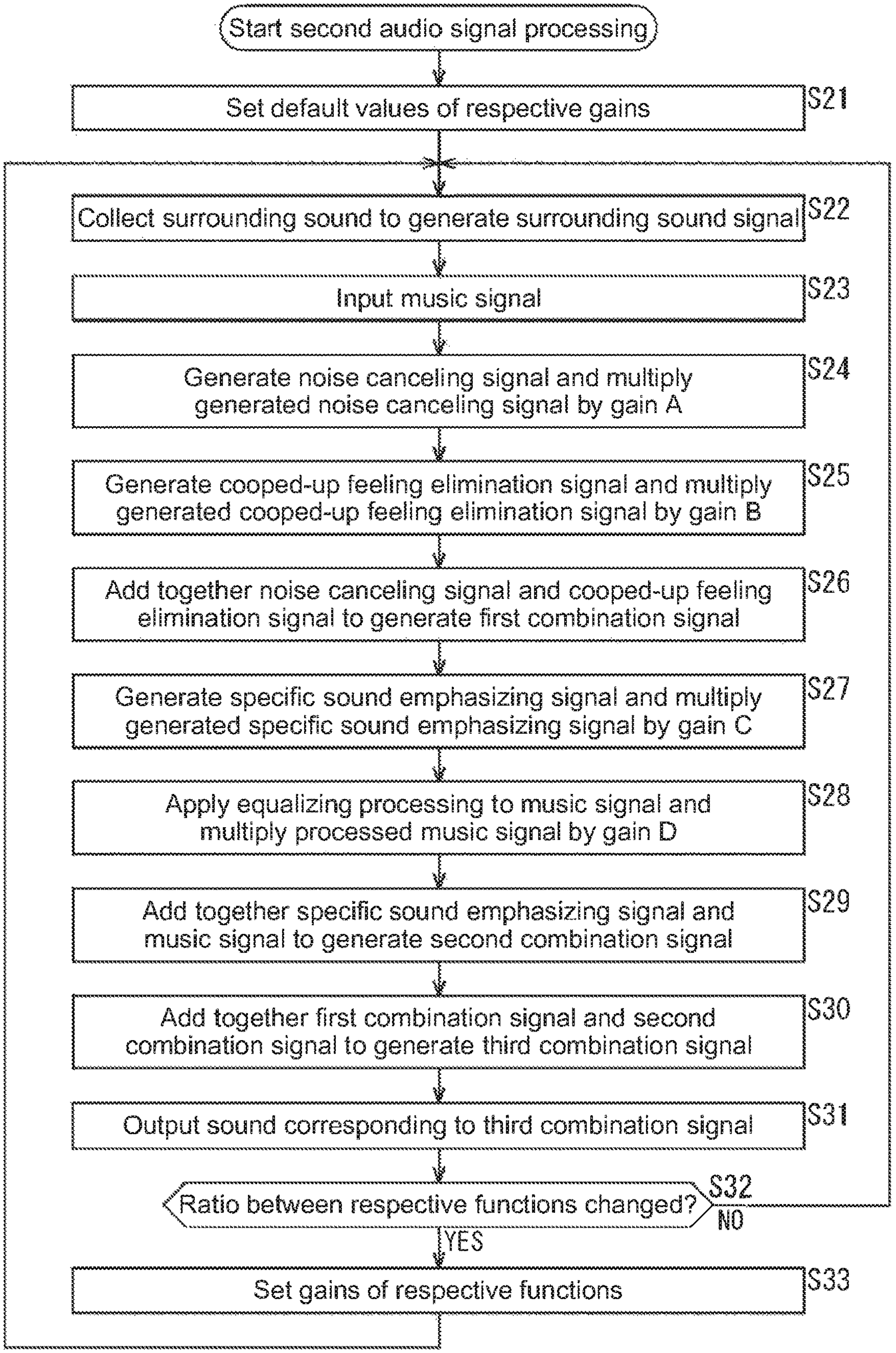
FIG. 15 is a flowchart describing second audio signal processing.

For example, the second audio signal processing of FIG. 15 starts when a second mode using the four functions, i.e., the noise canceling function, the cooped-up feeling elimination function, the specific sound emphasizing function, and the surrounding sound boosting function in combination is turned on and ends when the second mode is turned off.

According to the second audio signal processing described above, the user is allowed to simultaneously execute two or more of the four functions (audio signal processing functions) with the headphone 1. In addition, at this time, the user is allowed to set the effecting degrees of the respective simultaneously-executed functions at desirable ratios.

5. Example of Automatic Control Mode (Detailed Configuration Example of Analysis Control Section)

Next, a description will be given of the automatic control mode in which the signal processing unit 14 calculates the optimum ratios between the respective functions based on surrounding situations, user's operation states, or the like and controls the respective gains based on the calculation results.

Figure 16:
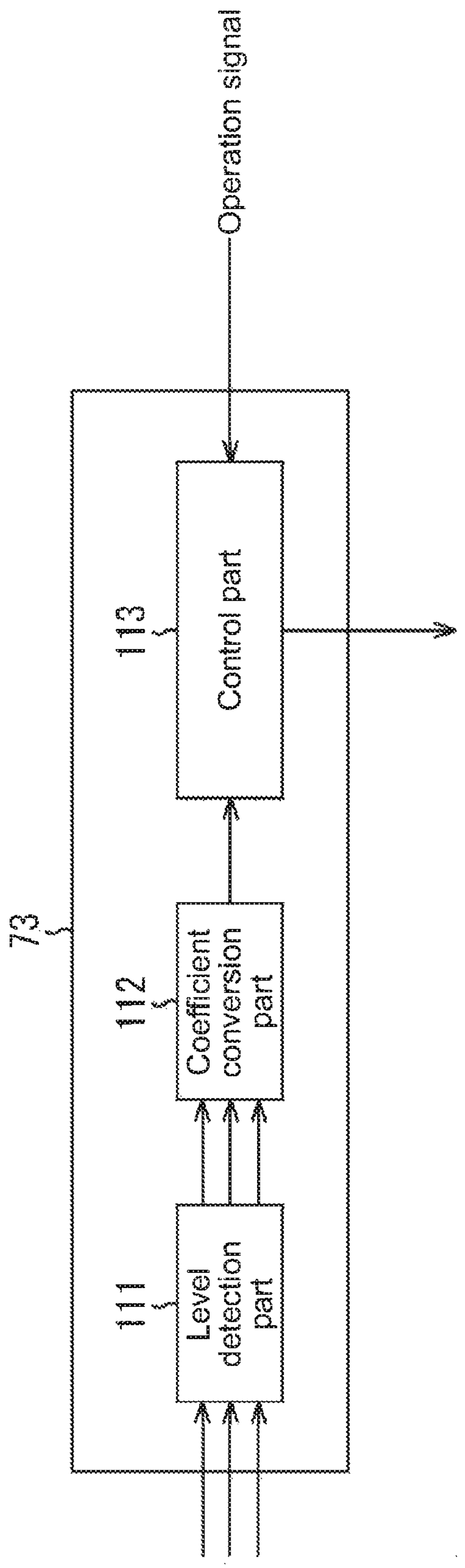
FIG. 16 is a block diagram showing a detailed configuration example of an analysis control section.

FIG. 16 is a block diagram showing a detailed configuration example of the analysis control section 73.

The analysis control section 73 has a level detection part 111, a coefficient conversion part 112, and a control part 113.

The level detection part 111 receives, besides a music signal from the audio input unit 13 and a microphone signal from the microphone 4, a sensor signal from a sensor that detects user's operation states and surrounding situations as occasion demands.

For example, the level detection part 111 may receive a sensor signal detected by a sensor such as a speed sensor, an acceleration sensor, and an angular speed sensor (gyro sensor) to detect a user's operation.

In addition, the level detection part 111 may receive a sensor signal detected by a sensor such as a body temperature sensor, a heart rate sensor, a blood pressure sensor, and a breathing rate sensor to detect user's living-body information.

Moreover, the level detection part 111 may receive a sensor signal from a GNSS (Global Navigation Satellite System) sensor that acquires positional information from a GNSS as represented by a GPS (Global Positioning System) to detect the location of the user. Further, the level detection part 111 may receive map information used in combination with the GNSS sensor.

For example, with a sensor signal from a speed sensor, an acceleration sensor, or the like, it is possible for the level detection part 111 to determine whether the user is at rest, walking, running, or riding on a vehicle such as a train, a car, and an airplane. In addition, with the combination of information such as a heart rate, blood pressure, and a breathing rate, it is possible for the level detection part 111 to determine whether the user is voluntarily taking action or passively taking action such as riding on a vehicle.

Moreover, with a sensor signal from a heart rate sensor, a blood pressure sensor, or the like, it is possible for the level detection part 111 to examine, for example, user's stress and emotion as to whether the user is in a relaxed state or a tensed state.

Further, with a microphone signal generated when a surrounding sound is collected, it is possible for the level detection part 111 to determine, for example, a user's current location such as an inside a bus or a train and an inside an airplane.

For example, the level detection part 111 detects the absolute value of a signal level and determines whether the signal level has exceeded a prescribed level (threshold) for each of various input signals. Then, the level detection part 111 outputs detection results to the coefficient conversion part 112.

The coefficient conversion part 112 determines the gain setting values of the variable amplifier 43, the variable amplifier 45', and the variable amplifier 92 based on the level detection results of the various signal supplied from the level detection part 111 and supplies the determined gain setting values to the control part 113. As described above, since the gain ratios between the variable amplifier 43, the variable amplifier 45', and the variable amplifier 92 equal the combining ratios between the noise canceling signal, the cooped-up feeling elimination signal (surrounding sound boosting signal), and the specific sound emphasizing signal, the coefficient conversion part 112 determines the ratios between the respective functions.

The control part 113 sets the respective gain setting values supplied from the coefficient conversion part 112 to the variable amplifier 43, the variable amplifier 45', and the variable amplifier 92.

Note that in a case in which the respective gains of the variable amplifier 43, the variable amplifier 45', and the variable amplifier 92 are desirably corrected due to a change in a user's operation state or the like, the control part 113 may gradually update the current gains to the corrected gains rather than immediately updating the same.

(Detailed Configuration Example of Level Detection Part)

Figure 17:
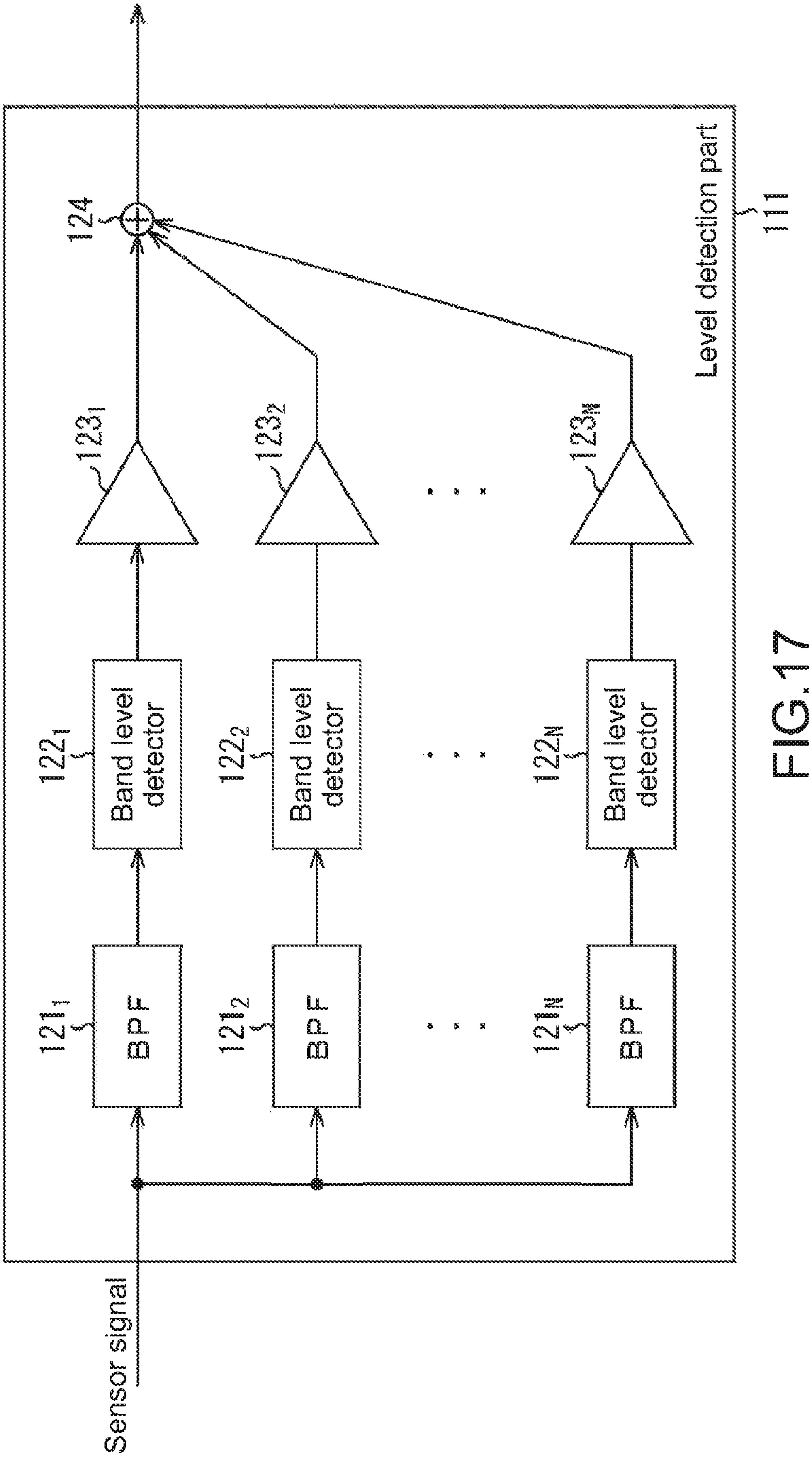
FIG. 17 is a block diagram showing a detailed configuration example of a level detection part.

FIG. 17 is a block diagram showing a detailed configuration example of the level detection part 111.

Note that FIG. 17 shows the configuration of the level detection part 111 for one input signal (for example, one sensor signal). However, the actual level detection part 111 has the configuration of FIG. 17 corresponding to the number of input signals.

The level detection part 111 has, besides an adder 124, BPFs 121, band level detectors 122, and amplifiers 123 in a plurality of systems corresponding to a plurality of divided frequency bands.

In the example of FIG. 17, assuming that an input signal is divided into input signals at N frequency bands to detect its level, the BPFs 121, the band level detectors 122, and the amplifiers 123 are provided M. That is, the level detection part 111 has the BFF $\mathbf{121}_1$, the band level detector $\mathbf{122}_1$, the amplifier $\mathbf{123}_1$, the BPF $\mathbf{121}_2$, the band level detector $\mathbf{122}_2$, the amplifier $\mathbf{123}_2$, the BPF $\mathbf{121}_N$, the band level detector $\mathbf{122}_N$, and the amplifier $\mathbf{123}_N$.

Out of the input signal, the BPFs 121 (BPFs $\mathbf{121}_1$ to $\mathbf{121}_N$) output only signals at allocated prescribed frequency bands to the following stages.

The band level detectors 122 (band level detectors $122_1$ to $122_N$) detect and output the absolute values of the levels of the signals output from the BPFs 121. Alternatively, the band level detectors 122 may output detection results showing whether the levels of the signals output from the BPFs 121 have exceeded prescribed levels or more.

The amplifiers 123 (amplifiers $123_1$ to $123_N$) multiply the signals output from the band level detectors 122 by prescribed gains and output the multiplied signals to the adder 124. The respective gains of the amplifiers $123_1$ to $123_N$ are set in advance according to the type of a sensor signal, detecting operations, or the like and may have the same value or different values.

The adder 124 adds together the signals output from the amplifiers $123_1$ to $123_N$ and outputs the added signal to the coefficient conversion part 112 of FIG. 16.

(Another Detailed Configuration Example of Level Detection Part)

Figure 18:
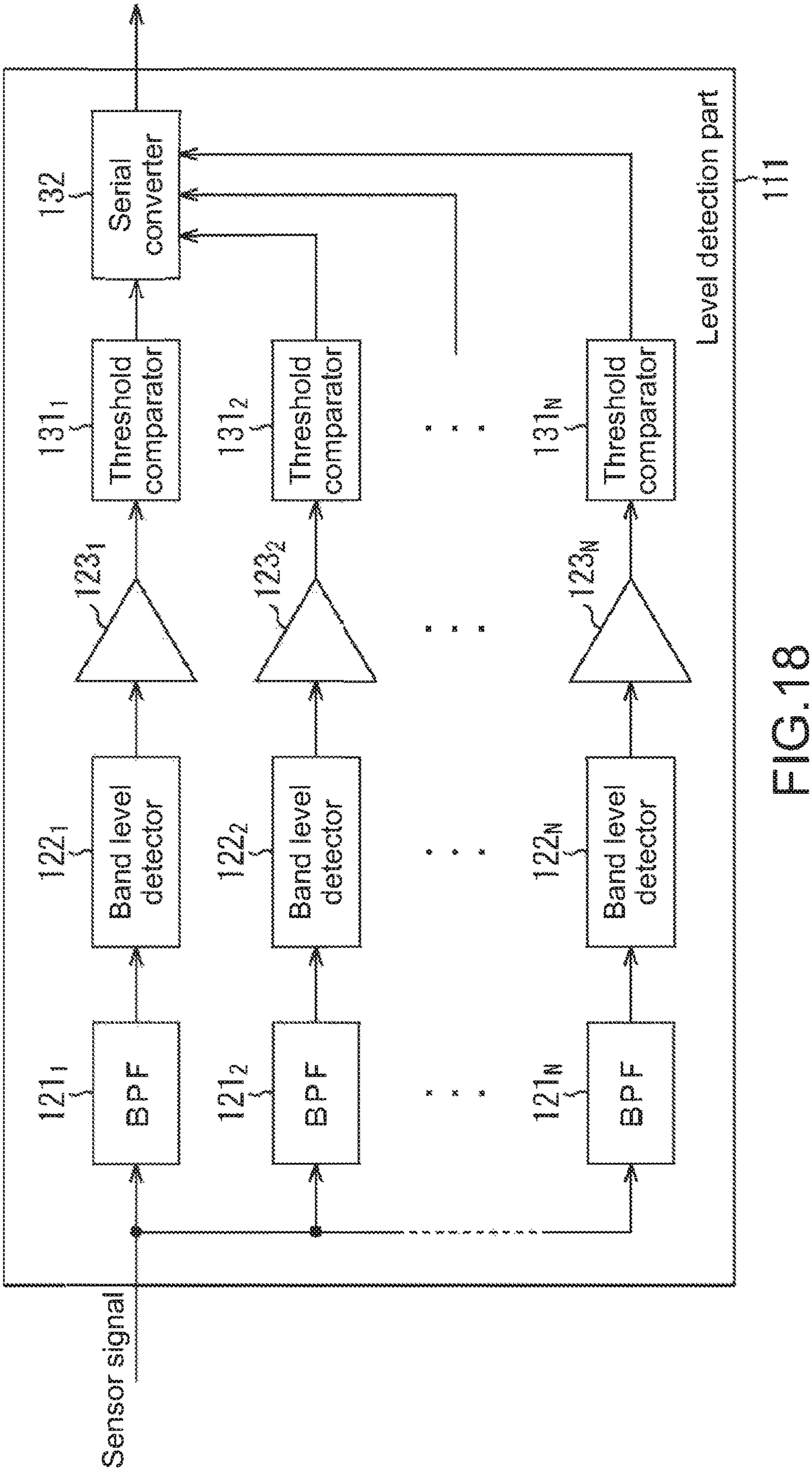
FIG. 18 is a block diagram showing another detailed configuration example of the level detection part.

FIG. 18 is a block diagram showing another detailed configuration example of the level detection part 111.

Note that in FIG. 18, the same constituents as those of FIG. 17 are denoted by the same symbols and their descriptions will be omitted.

In the level detection part 111 shown in FIG. 18, threshold comparators $131_1$ to $131_N$ are arranged behind the amplifiers $123_1$ to $123_N$, respectively, and a serial converter 132 is arranged behind the threshold comparators $131_1$ to $131_N$.

The threshold comparators 131 (threshold comparators $131_1$ to $131_N$) determine whether signals output from the precedently-arranged amplifiers 123 have exceeded prescribed thresholds and then output determination results to the serial converter 132 as "0" or "1."

The serial converter 132 converts "0" or "1" showing the determination results input from the threshold comparators $131_1$ to $131_N$ into serial data and outputs the converted serial data to the coefficient conversion part 112 of FIG. 16.

The coefficient conversion part 112 estimates surrounding environments and user's operation states based on an output from the level detection part 111 for a plurality of types of signals including a microphone signal, various sensor signals, or the like. In other words, the coefficient conversion part 112 extracts various feature amounts showing the surrounding environments and the user's operation states from the plurality of types of signals output from the level detection part 111. Then, the coefficient conversion part 112 estimates the surrounding environments and the user's operation states of which the feature amounts satisfy prescribed standards as the user's current operation states and the current surrounding environments. After that, the coefficient conversion part 112 determines the gains of the variable amplifier 43, the variable amplifier 45', and the variable amplifier 92 based on the estimation result.

Note that the level detection part 111 may use a signal obtained in such a way that the signals passing through the BPFs 121 or the band level detectors 122 are integrated in a time direction through an FIR filter or the like.

In addition, in the examples described above, the input signal is divided into the input signals at the plurality of frequency bands and subjected to the signal processing at the respective frequency bands. However, the input signal is not necessarily divided into the input signals at the plurality of frequency bands but may be frequency-analyzed as it is.

That is, a method of estimating surrounding environments and user's operation states from the input signal is not limited to a particular method, but any method is available.

(Example of Automatic Control)

FIG. 19 shows an example of control based on the automatic control mode.

More specifically, FIG. 19 shows an example in which the analysis control section 73 estimates current situations based on user's locations, surrounding noises, user's operation states, and the volumes of music to which the user is listening and appropriately sets the functions.

For example, with the frequency-analysis of a microphone signal acquired by the microphone 4, it is possible for the analysis control section 73 to determine a user's location such as (the inside of) an airplane, (the inside of) a train, (the inside of) a bus, an office, a hall, an outdoor place (silent), and an indoor place (noisy).

In addition, with the frequency-analysis of a microphone signal different from the frequency-analysis for determining a user's location, it is possible for the analysis control section 73 to determine whether surrounding noises are stationary noises or non-stationary noises.

Moreover, with the analysis of a sensor signal from a speed sensor or an acceleration sensor, it is possible for the analysis control section 73 to determine a user's operation state, i.e., whether the user is at rest, walking, or running.

Further, with the value of the gain D set in the variable amplifier 94, it is possible for the analysis control section 73 to determine the volume of music to which the user is listening.

For example, when recognizing that the user is located inside an airplane, the surrounding noises are stationary noises, the user is at rest, and the volume of music is off (mute), the analysis control section 73 estimates that the user is inside the airplane and executes the noise canceling processing 100%.

For example, when recognizing that the user is inside an airplane, the surrounding noises are non-stationary noises, the user is at rest, and the volume of music is off (mute), the analysis control section 73 estimates that the user is inside the airplane and listening to in-flight announcements or talking to a flight attendant, the analysis control section 73 executes the specific sound emphasizing processing 50% and the noise canceling processing 50%.

For example, when recognizing that the user is in an office, the surrounding noises are stationary noises, the user is at rest, and the volume of music is off (mute), the analysis control section 73 estimates that the user is working alone in the office and executes the noise canceling processing 100%.

For example, when recognizing that the user is in an office, the surrounding noises are non-stationary noises, the user is at rest, and the volume of music is off (mute), the analysis control section 73 estimates that the user is in the office and attending a meeting in which he/she is sometimes listening to comments by participants and executes the specific sound emphasizing processing 50% and the noise canceling processing 50%.

For example, when recognizing that the user is in a silent outdoor place, the surrounding noises are stationary noises, the user is walking or running, and the volume of music is low or so, the analysis control section 73 executes the cooped-up feeling elimination processing 100% to allow the user to notice and avoid dangers during his/her movements.

For example, when recognizing that the user is in a silent outdoor place, the surrounding noises are stationary noises, the user is walking or running, and the volume of music is middle or so, the analysis control section 73 executes the cooped-up feeling elimination processing 50%, the specific sound emphasizing processing 25%, and the noise canceling processing 25% to allow the user to notice and avoid dangers during his/her movements.

As described above, the analysis control section 73 is allowed to execute the operation state estimation processing for estimating (recognizing) the operations and states of the user with respect to each of a plurality of types of input signals and determine and set the respective gains of the variable amplifier 43, the variable amplifier 45', and the variable amplifier 92 based on the estimated user's operations and states.

Note that FIG. 19 shows the example in which the user's current situations are estimated and the ratios between the respective functions (gains) are determined using a plurality of types input signals such as a microphone signal and a sensor signal. However, the estimation processing may be appropriately set using any input signal. For example, user's current situations may be estimated using only one input signal.

6. Applied Example

The signal processing unit 14 of the headphone 1 may have a storage section that stores a microphone signal collected and generated by the microphone 4 and have a recording function that records the microphone signal for a certain period of time and a reproduction function that reproduces the stored microphone signal.

The headphone 1 is allowed to execute, for example, the following playback function using the recording function.

For example, it is assumed that the user is attending a lesson or participating in a meeting to listen to comments with the cooped-up feeling elimination function turned on. The headphone 1 collects surrounding sounds with the microphone 4 and executes the cooped-up feeling elimination processing, while storing a microphone signal collected and generated by the microphone 4 in the memory of the signal processing unit 14.

If the user fails to listen to the comments in the lesson or the meeting, he/she presses, for example, the playback operation button of the operation unit 12 to execute the playback function.

When the playback operation button is pressed, the signal processing unit 14 of the headphone 1 changes its current signal processing function (mode) from the cooped-up feeling elimination function to the noise canceling function. However, the storage (i.e., recording) of the microphone signal collected and generated by the microphone 4 in the memory is executed in parallel.

Then, the signal processing unit 14 reads and reproduces the microphone signal, which has been collected and generated by the microphone 4 before prescribed time, from the inside memory and outputs the same from the speaker 3. At this time, since the noise canceling function is being executed, the user is allowed to listen to the reproduced signal free from surrounding noises and intensively listen to the comments to which the user has failed to listen.

When the reproduction of the playback part ends, the signal processing function (mode) is restored from the noise canceling function to the initial cooped-up feeling elimination function.

The playback function is executed in the way as described above. With the playback function, it is possible for the user to instantly confirm sounds to which the user has failed to listen. The same playback function as the above may be realized not only with the cooped-up feeling elimination function but with the surrounding sound boosting function.

Note that a playback part may be reproduced at a speed (for example, double speed) faster than a normal speed (single speed). Thus, the quick restoration of the initial cooped-up feeling elimination function is allowed.

In addition, when a playback part is reproduced, surrounding noises recorded during the reproduction of the playback part may also be reproduced in succession to the playback part at a speed faster than a normal speed. Thus, the user is allowed to avoid failing to listen to sounds during the playback.

When switching between the cooped-up feeling elimination function and the noise canceling function at the start and the end of the playback function, cross-fade processing, in which the combining ratio between the cooped-up feeling elimination signal and the noise canceling signal is gradually changed with time, may be executed to reduce a feeling of strangeness due to the switching.

7. Modified Example

The embodiments of the present disclosure are not limited to the embodiments described above but may be modified in various ways within the spirit of the present disclosure.

For example, the headphone 1 may be implemented as a headphone such as an outer ear headphone, an inner ear headphone, an earphone, a headset, and an active headphone.

In the embodiments described above, the headphone 1 has the operation unit 12 that allows the user to set the ratios between the plurality of functions and has the signal processing unit 14 that applies the signal processing corresponding to the respective functions. However, these functions may be provided in, for example, an outside apparatus such as a music reproduction apparatus and a smart phone to which the headphone 1 is connected.

For example, in a state in which the single-axis operation area 52 or the reverse T-shaped operation area 101 is displayed on the screen of a music reproduction apparatus or a smart phone, the music reproduction apparatus or the smart phone may execute the signal processing corresponding to the respective functions.

Alternatively, in a state in which the single-axis operation area 52 or the reverse T-shaped operation area 101 is displayed on the screen of a music reproduction apparatus or a smart phone, the signal processing unit 14 of the headphone 1 may execute the signal processing corresponding to the respective functions when an operation signal is transmitted to the headphone 1 as a wireless signal under Bluetooth™ or the like.

In addition, the signal processing unit 14 described above may be a standalone signal processing apparatus. Moreover, the signal processing unit 14 described above may be incorporated as a part of a mobile phone, a mobile player, a computer, a PDA (Personal Data Assistance), and a hearing aid in the form of a DSP (Digital Signal Processor) or the like.

The signal processing apparatus of the present disclosure may employ a mode in which all or a part of the plurality of embodiments described above are combined together.

The signal processing apparatus of the present disclosure may have the configuration of cloud computing in which a part of the series of audio signal processing described above is shared between a plurality of apparatuses via a network in a cooperative way.

(Hardware Configuration Example of Computer)

The series of audio signal processing described above may be executed not only by hardware but by software.

When the series of audio signal processing is executed by software, a program constituting the software is installed in a computer. Here, examples of the computer include computers incorporated in dedicated hardware and general-purpose personal computers capable of executing various functions with the installation of various programs.

Figure 20:
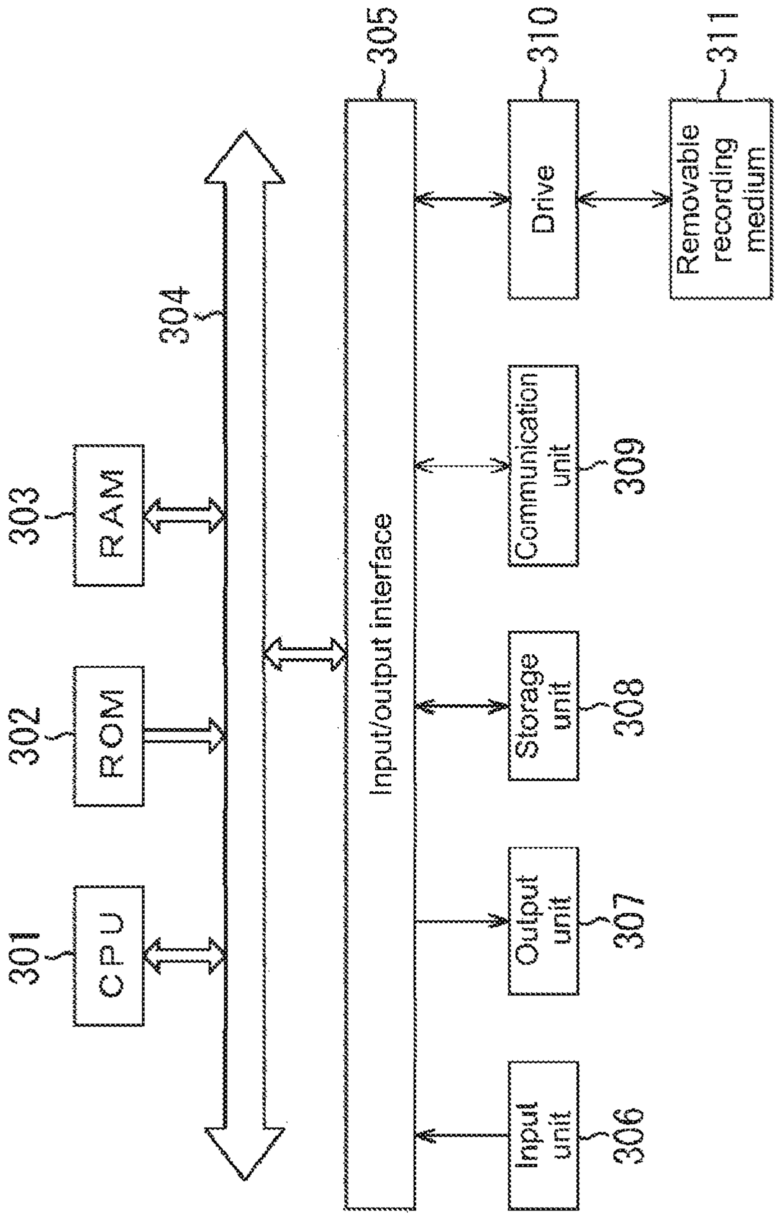
FIG. 20 is a block diagram showing a configuration example of an embodiment of a computer according to the present disclosure.

FIG. 20 is a block diagram showing a hardware configuration example of a computer that executes the series of audio signal processing described above according to a program.

In the computer, a CPU (Central Processing Unit) 301, a ROM (Read Only Memory) 302, a RAM (Random Access Memory) 303 are connected to one another via a bus 304.

In addition, an input/output interface 305 is connected to the bus 304. The input/output interface 305 is connected to an input unit 306, an output unit 307, a storage unit 308, a communication unit 309, and a drive 310.

The input unit 306 includes a keyboard, a mouse, a microphone, or the like. The output unit 307 includes a display, a speaker, or the like. The storage unit 308 includes a hard disk, a non-volatile memory, or the like. The communication unit 309 includes a network interface or the like. The drive 310 drives a magnetic disk, an optical disk, a magnetic optical disk, or a removable recording medium 311 such as a semiconductor memory.

For example, in the computer described above, the CPU 301 loads a program stored in the storage unit 308 into the RAM 303 via the input/output interface 305 and the bus 304 and executes the same to perform the series of audio signal processing described above.

In the computer, a program may be installed in the storage unit 308 via the input/output interface 305 when a removable recording medium 311 is mounted in the drive 310. In addition, a program may be received by the communication unit 309 via a wired or wireless transmission medium such as a local area network, the Internet, and digital satellite broadcasting and installed in the storage unit 308. Besides, a program may be installed in advance in the ROM 302 or the storage unit 309.

Note that besides being chronologically executed in the orders described in the specification, the steps in the flowcharts may be executed in parallel or at appropriate timing such as when being invoked.

In addition, the respective steps in the flowcharts described above may be executed by one apparatus or may be executed by a plurality of apparatuses in a cooperative way.

Moreover, when one step includes a plurality of processing, the plurality of processing included in the one step may be executed by one apparatus or may be executed by a plurality of apparatuses in a cooperative way.

Note that the effects described in the specification are only for illustration but effects other than the effects in the specification may be produced.

Note that the present disclosure may also employ the following configurations.

(1) A signal processing apparatus, including:

a surrounding sound signal acquisition unit configured to collect a surrounding sound to generate a surrounding sound signal;

a NC (Noise Canceling) signal generation part configured to generate a noise canceling signal from the surrounding sound signal;

a cooped-up feeling elimination signal generation part configured to generate a cooped-up feeling elimination signal from the surrounding sound signal; and an addition part configured to add together the generated noise canceling signal and the cooped-up feeling elimination signal at a prescribed ratio.

(2) The signal processing apparatus according to (1), further including:

a specific sound emphasizing signal generation part configured to generate a specific sound emphasizing signal, which emphasizes a specific sound, from the surrounding sound signal, in which the addition part is configured to add the generated specific sound emphasizing signal to the noise canceling signal and the cooped-up feeling elimination signal at a prescribed ratio.

(3) The signal processing apparatus according to (1) or (2), in which the cooped-up feeling elimination signal generation part is configured to increase a level of the cooped-up feeling elimination signal to further generate a surrounding sound boosting signal, and the addition part is configured to add together the generated noise canceling signal and the surrounding sound boosting signal at a prescribed ratio.

(4) The signal processing apparatus according to any one of (1) to (3), further including:

an audio signal input unit configured to accept an input of an audio signal, in which the addition part is configured to add the input audio signal to the noise canceling signal and the cooped-up feeling elimination signal at a prescribed ratio.

(5) The signal processing apparatus according to any one of (1) to (4), further including:

a surrounding sound level detector configured to detect a level of the surrounding sound signal; and a ratio determination unit configured to determine the prescribed ratio according to the detected level, in which the addition part is configured to add together the generated noise canceling signal and the cooped-up feeling elimination signal at the prescribed ratio determined by the ratio determination unit.

(6) The signal processing apparatus according to (5), in which the surrounding sound level detector is configured to divide the surrounding sound signal into signals at a plurality of frequency bands and detect the level of the signal for each of the divided frequency bands.

(7) The signal processing apparatus according to any one of (1) to (6), further including:

an operation unit configured to accept an operation for determining the prescribed ratio by a user.

(8) The signal processing apparatus according to any one of (1) to (7), in which the operation unit is configured to scalably accept the prescribed ratio in such a way as to accept an operation on a single axis having a noise canceling function used to generate the noise canceling signal and a cooped-up feeling elimination function used to generate the cooped-up feeling elimination signal as end points thereof.

(9) The signal processing apparatus according to any one of (1) to (8), further including:

a first sensor signal acquisition part configured to acquire an operation sensor signal used to detect an operation state of a user; and a ratio determination unit configured to determine the prescribed ratio based on the acquired operation sensor signal, in which the addition part is configured to add together the generated noise canceling signal and the cooped-up feeling elimination signal at the prescribed ratio determined by the ratio determination unit.

(10) The signal processing apparatus according to any one of (1) to (9), further including:

a second sensor signal acquisition part configured to acquire a living-body sensor signal used to detect living-body information of a user; and a ratio determination unit configured to determine the prescribed ratio based on the acquired living-body sensor signal, in which the addition part is configured to add together the generated noise canceling signal and the cooped-up feeling elimination signal at the prescribed ratio determined by the ratio determination unit.

(11) The signal processing apparatus according to any one of (1) to (10), further including:

a storage unit configured to store the cooped-up feeling elimination signal generated by the cooped-up feeling elimination signal generation part; and a reproduction unit configured to reproduce the cooped-up feeling elimination signal stored in the storage unit.

(12) The signal processing apparatus according to (11), in which the reproduction unit is configured to reproduce the cooped-up feeling elimination signal stored in the storage unit at a speed faster than a single speed.

(13) A signal processing method, including:

collecting a surrounding sound to generate a surrounding sound signal;

generating a noise canceling signal from the surrounding sound signal;

generating a cooped-up feeling elimination signal from the surrounding sound signal; and adding together the generated noise canceling signal and the cooped-up feeling elimination signal at a prescribed ratio.

(14) A program that causes a computer to function as:

a surrounding sound signal acquisition unit configured to collect a surrounding sound to generate a surrounding sound signal;

a NC (Noise Canceling) signal generation part configured to generate a noise canceling signal from the surrounding sound signal;

a cooped-up feeling elimination signal generation part configured to generate a cooped-up feeling elimination signal from the surrounding sound signal; and an addition part configured to add together the generated noise canceling signal and the cooped-up feeling elimination signal at a prescribed ratio.

What is claimed is:

1. A signal processing apparatus, comprising:

a microphone configured to generate a first ambient sound signal;

a level detector configured to detect a first level of the first ambient sound signal and a second level of the first ambient sound signal; and circuitry configured to:

generate a noise canceling signal based on the first ambient sound signal;

generate an ambient sound listening signal based on the first ambient sound signal;

generate a second ambient sound signal;

mix the noise canceling signal and the ambient sound listening signal in a first ratio, wherein the first ratio is based on the first level; and mix the noise canceling signal and the second ambient sound signal in a second ratio, wherein the second ratio is based on the second level.

2. The signal processing apparatus according to claim 1, wherein the circuitry is further configured to:

generate a specific sound emphasizing signal based on the first ambient sound signal, wherein a specific sound is emphasized in the specific sound emphasizing signal; and mix the specific sound emphasizing signal, the noise canceling signal, and the ambient sound listening signal in a third ratio.

3. The signal processing apparatus according to claim 1, wherein the circuitry is further configured to:

input an audio signal; and mix the audio signal, the noise canceling signal, and the ambient sound listening signal in a fourth ratio.

4. The signal processing apparatus according to claim 1, wherein the circuitry is further configured to determine the first ratio based on the first level.

5. The signal processing apparatus according to claim 4, wherein the level detector is further configured to:

divide the first ambient sound signal into a plurality of signals at a plurality of frequency bands; and detect a third level for each of the plurality of signals.

6. The signal processing apparatus according to claim 1, further comprising an operation interface configured to accept a user operation to determine the first level based on the user operation.

7. The signal processing apparatus according to claim 6, wherein the operation interface is further configured to operate to input the first level in a scale based on the user operation in a single axis.

8. The signal processing apparatus according to claim 1, further comprising:

a first sensor configured to acquire an operation detection signal to detect an operation state of a user, wherein the circuitry is further configured to determine the first ratio based on the operation detection signal.

9. The signal processing apparatus according to claim 1, further comprising:

a second sensor configured to acquire a living-body sensor signal to detect a living-body information of a user, wherein the circuitry is further configured to determine the first ratio based on the living-body sensor signal.

10. The signal processing apparatus according to claim 1, further comprising a storage unit configured to store the ambient sound listening signal, wherein the circuitry is further configured to reproduce the ambient sound listening signal stored in the storage unit at a first speed.

11. The signal processing apparatus according to claim 1, wherein the second ambient sound signal is an ambient sound boosting signal.

12. A signal processing method, comprising:

in a signal processing apparatus, generating a first ambient sound signal;

detecting a first level of the first ambient sound signal and a second level of the first ambient sound signal;

generating a noise canceling signal based on the first ambient sound signal;

generating an ambient sound listening signal based on the first ambient sound signal;

generating a second ambient sound signal;

mixing the noise canceling signal and the ambient sound listening signal in a first ratio, wherein the first ratio is based on the first level; and mixing the noise canceling signal and the second ambient sound signal in a second ratio, wherein the second ratio is based on the second level.

13. A non-transitory computer-readable medium having stored thereon, computer-executable instructions for causing a computer to execute operations, the operations comprising:

generating a first ambient sound signal;

detecting a first level of the first ambient sound signal and a second level of the first ambient sound signal;

generating a noise canceling signal based on the first ambient sound signal;

generating an ambient sound listening signal based on the first ambient sound signal;

generating a second ambient sound signal;

mixing the noise canceling signal and the ambient sound listening signal in a first ratio, wherein the first ratio is based on the first level; and mixing the noise canceling signal and the second ambient sound signal in a second ratio, wherein the second ratio is based on the second level.

* * * * *